(12) United States Patent
Wu et al.

(10) Patent No.: US 7,448,224 B2
(45) Date of Patent: Nov. 11, 2008

(54) MODULAR DEHUMIDIFIER

(75) Inventors: Guolian Wu, St. Joseph, MI (US); Nihat O. Cur, St. Joseph, MI (US); Andrew D. Litch, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 510 days.

(21) Appl. No.: 11/025,498

(22) Filed: Dec. 29, 2004

(65) Prior Publication Data
US 2006/0053819 A1      Mar. 16, 2006

Related U.S. Application Data

(60) Provisional application No. 60/522,309, filed on Sep. 14, 2004.

(51) Int. Cl.
*F25D 19/02* (2006.01)

(52) U.S. Cl. ............... 62/77; 62/259.1; 62/314; 62/298; 454/156

(58) Field of Classification Search .......... 62/298, 62/93, 426, 285, 314, 419, 77, 259.1, 262–263; 165/122; 454/156

See application file for complete search history.

(56) References Cited

U.S. PATENT DOCUMENTS

| 5,203,400 | A | * | 4/1993 | Tsunekawa et al. | ........... 165/59 |
| 5,335,721 | A | * | 8/1994 | Wollaber et al. | ............ 165/122 |
| 6,568,201 | B1 | * | 5/2003 | Cur et al. | ....................... 62/262 |
| 6,692,223 | B2 | * | 2/2004 | Ikeda et al. | ................ 415/53.1 |
| 6,962,195 | B2 | * | 11/2005 | Smith et al. | .................. 165/202 |
| 7,021,076 | B2 | * | 4/2006 | Park et al. | ...................... 62/262 |
| 7,156,166 | B2 | * | 1/2007 | Bendell et al. | .............. 165/203 |

FOREIGN PATENT DOCUMENTS

| JP | 11198647 | A | * | 7/1999 |
| JP | 2006068580 | A | * | 3/2006 |

* cited by examiner

*Primary Examiner*—William E Tapolcai
(74) *Attorney, Agent, or Firm*—John Morrison; Michael D. Lafrenz

(57) ABSTRACT

A smaller configuration air treatment appliance that can perform multiple air treatment functions and which has a modular design that enables the manufacturer to reduce the cost of the appliance.

20 Claims, 25 Drawing Sheets

MODULAR DEHUMIDIFIER

CROSS-REFERENCE TO RELATED APPLICATION

This application claims the benefit of U.S. provisional application Ser. No. 60/522,309, filed Sep. 14, 2004, which is incorporated herein by reference in its entirety.

BACKGROUND OF THE INVENTION

1. Field of the Invention

The invention relates generally to dehumidifiers for removing humidity from the ambient air, and more particularly to a compact dehumidifier having a modular design for readily interchanging component parts.

2. Description of the Related Art

Dehumidifiers and other portable air treatment devices, such as air cleaners, and personal coolers (also known as "swamp coolers"), are a common consumer products for use in the home and office.

Conventional dehumidifiers typically comprise a compressor located in a lower portion of a chassis behind a condensate collection bucket. An air flow system draws in ambient air which is dehumidified and expelled from the dehumidifier. The air flow system typically comprises an axial fan which draws air through evaporator and condenser coils before being expelled. The air flow system is typically mounted in an upper portion of the chassis above the condensate collection bucket and the compressor. This configuration results in a relatively tall and/or wide configuration, which takes up a lot of space in the room and which is cumbersome to move.

All things being equal, consumers prefer as small a configuration as possible so that the portable dehumidifier does not take up any more space in the room than is necessary. Unfortunately, the design of current dehumidifiers requires a reduction in dehumidifier capacity, either moisture removal rate or the size of the collection bucket, to obtain a smaller configuration. However, either of these capacity reductions have negative consequences for at least some segment of the consumers. The reduction in the rate of moisture removal means the dehumidifier may not be able to meet the consumer's needs in drying out a room, especially if it is a larger room or has higher humidity. The reduction in the collection bucket capacity increases the frequency with which the condensate collection bucket must be emptied. In most cases, consumers will accept a larger configuration to maintain the capacity that they need. Thus, there is still a need for a dehumidifier with a smaller configuration while maintaining the needed capacity.

In the same way that consumers would prefer a smaller configuration, consumers would also prefer fewer appliances. In the context of air treatment devices, consumers often use multiple appliances. For example, the consumer may desire a dehumidifier for summer use, a humidifier for winter use, and an air cleaner for year-round use. This will necessitate three separate air treatment devices.

To the extent that one appliance can perform multiple functions, whether directly or by simple modification, it is highly desired by the consumer. In the case of air treatment devices, they typically share a subset of components, even though not all devices require the same components. For example, dehumidifiers and swamp coolers both use blowers and collection buckets/reservoirs. Air cleaners often use forced air in combination with a suitable filter element.

It should not be forgotten that consumers would prefer to have the increased functionality and smaller size without any additional cost in the appliance. This puts a great burden on the manufacturer to create a design that meets or closely meets both the consumer's functional and cost needs.

From the manufacturer's viewpoint, while the air treatment appliances do often share common components, the components in one appliance for one function may not be optimized for another function, leading to the appliance. Often the manufacturer will design for the worst case function, which can lead to over design for the other functions. This has the tendency to increase the cost to the consumer, which is undesirable.

Therefore, there is a strong desire and need for manufacturers to provide consumers with as few air treatment appliances as possible to meet the consumer's air treatment needs while minimizing the cost, which is a very difficult task.

SUMMARY OF THE INVENTION

A dehumidifier comprises a housing having an inlet and an outlet and defining an air flow path from the inlet to the outlet, a blower located within the air flow path and operable to draw air into the inlet and expel air through the outlet, a heat exchanger located within the air flow path, and a compressor fluidly connected to the heat exchanger and at least a portion of the compressor is located within the air flow path such that air flowing through the air flow path cools the compressor.

The dehumidifier can further comprise a chamber extending from the inlet to the outlet to define the air flow path, and a scroll located within the housing and at least partially defining the air flow path. The heat exchanger can be downstream of the inlet, the blower can be downstream of the heat exchanger, and the compressor can be downstream of the heat exchanger. The outlet can be located above the inlet.

The blower can be located within the housing such that it rotates about a horizontal axis, and can be configured to emit air. The dehumidifier can further comprise a control panel located between the inlet and the outlet.

A modular air treatment appliance platform comprises a common module comprising a chassis, and an airflow module mounted to the chassis, and a specific air treatment appliance module mountable to the common module to form a completed air treatment appliance.

The specific air treatment module can comprise at least one of: a dehumidifier module, a swamp cooler module, a heater module, and an air cleaner module. The airflow module can comprise a crossflow blower, and a scroll for at least partially defining an air flow path.

The specific air treatment module for the dehumidifier can comprise a heat exchanger and a compressor fluidly connected to the heat exchanger, and a condensate reservoir. The condensate reservoir can comprise a bucket mounted to the chassis, or a container mounted to an exterior portion of the completed air treatment appliance. The heat exchanger can comprise a condenser and an evaporator.

The condenser can be downstream of the evaporator, or adjacent the evaporator. The evaporator and the condenser can be arranged in a coplanar relationship. The evaporator can comprise a plurality of heat-dissipating fins and at least one interceptor plate for intercepting condensate from the fins, the at least one evaporator plate can be transverse or orthogonal to the heat-dissipating fins, and at least one evaporator plate can be horizontally disposed and the heat-dissipating fins can be vertically disposed.

The specific air treatment module for the swamp cooler can comprise a wicking element, a pump, and a reservoir. The specific air treatment module for the heater can comprise an electric heating element. The specific air treatment module for the air cleaner can comprise at least one of a filter and an electrostatic precipitator. The at least one of the filter and the electrostatic precipitator can be one of upstream and downstream of the blower.

The modular air treatment appliance platform can comprise an inlet for drawing air into the completed air treatment appliance and an outlet for exhausting air from the completed air treatment appliance, the inlet and the outlet at least partially defining the air flow path, and the blower and the at least one of the filter and the electrostatic precipitator lie within the air flow path. The at least one of the filter and the electrostatic precipitator can be mounted to an exterior portion of the completed air treatment appliance. The filter can be mounted upstream of the inlet.

The specific air treatment module can comprise the dehumidifier module and the air cleaner module, the heater module and the air cleaner module, or the swamp cooler module and the air cleaner module.

The modular air treatment appliance platform can comprise at least one of a front and rear module mounted to the common module, a control module mounted to the common module, and a base module mounted to the common module. The front module can comprise one of: a housing element, air cleaning module, and swamp cooler module. The rear module can comprise one of: a housing element, a dehumidifier module, and an air cleaning module, the base module can comprise one of: a condensate bucket, an endless loop filter, and a water supply reservoir.

DESCRIPTION OF AN EMBODIMENT OF THE INVENTION

Figure 1:
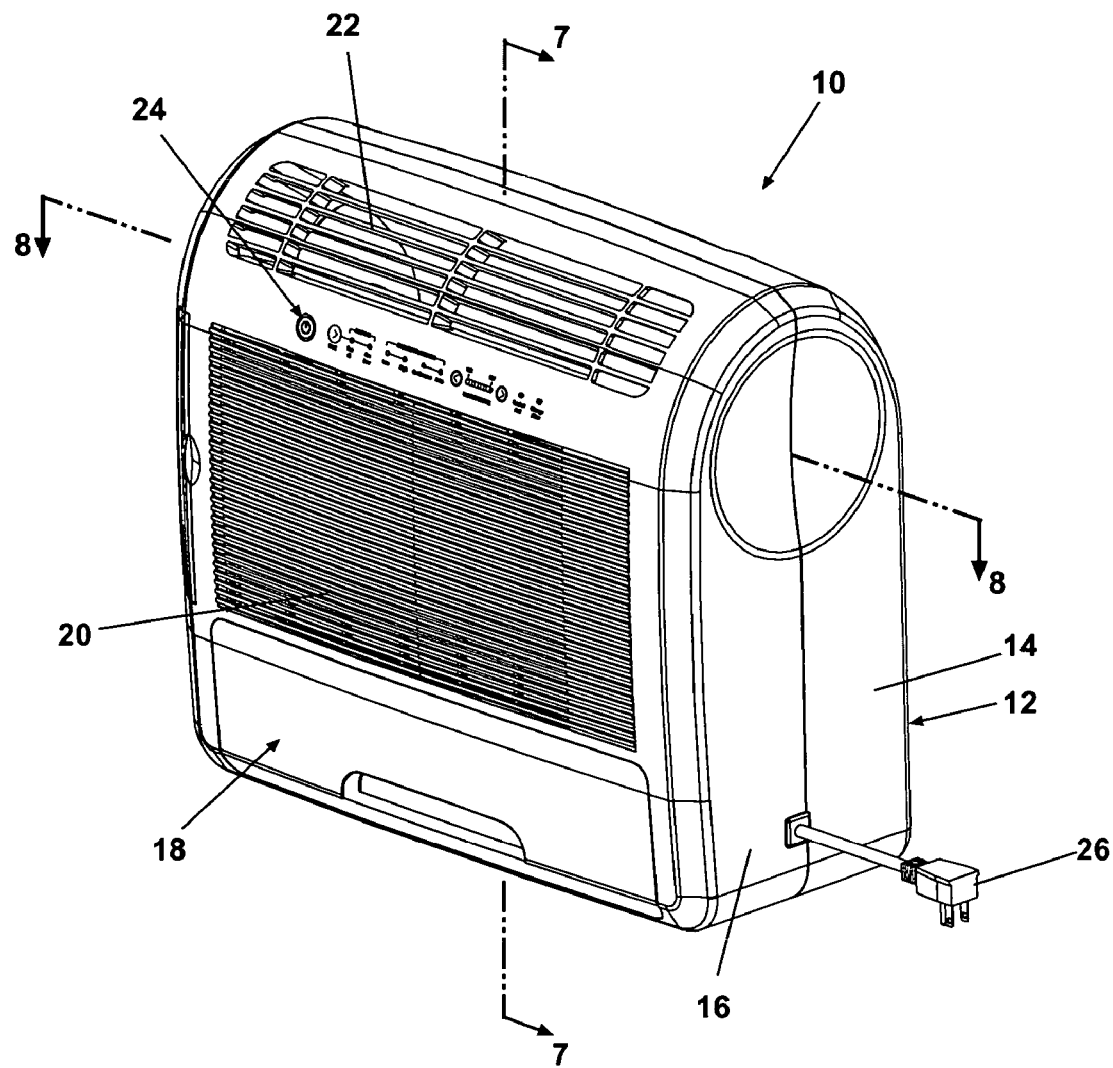
FIG. 1 is a perspective view of a first embodiment of a modular portable air treatment device according to the invention comprising a dehumidifier.

Referring to the Figures, and in particular to FIG. 1, a modular portable air treatment device 10 is shown comprising a housing assembly 12 having a rear housing 14 and a front housing 16 in abutting cooperative registry. The housing assembly 12 encloses various operable components which will be described hereinafter. The front housing 16 has a front grille 20 extending generally over the front face of the housing 16, and a top grille 22 above the front grille 20 oriented for directing an upward flow of air therethrough. Thus, with respect to the direction of airflow through the modular portable air treatment device 10, the front grille 20 is defined herein as upstream of the top grille 22. Similarly, a first component, such as a filter or a heat exchanger coil, is upstream of a second component if air flow through the modular portable air treatment device 10 is from the first component to the second component.

A control panel 24 is located between the front and top grilles 20, 22. The device 10 is also provided with a power plug 26 for providing power to the device 10. A suitable opening is provided in the front housing 16 for the power plug 26.

Figure 2:
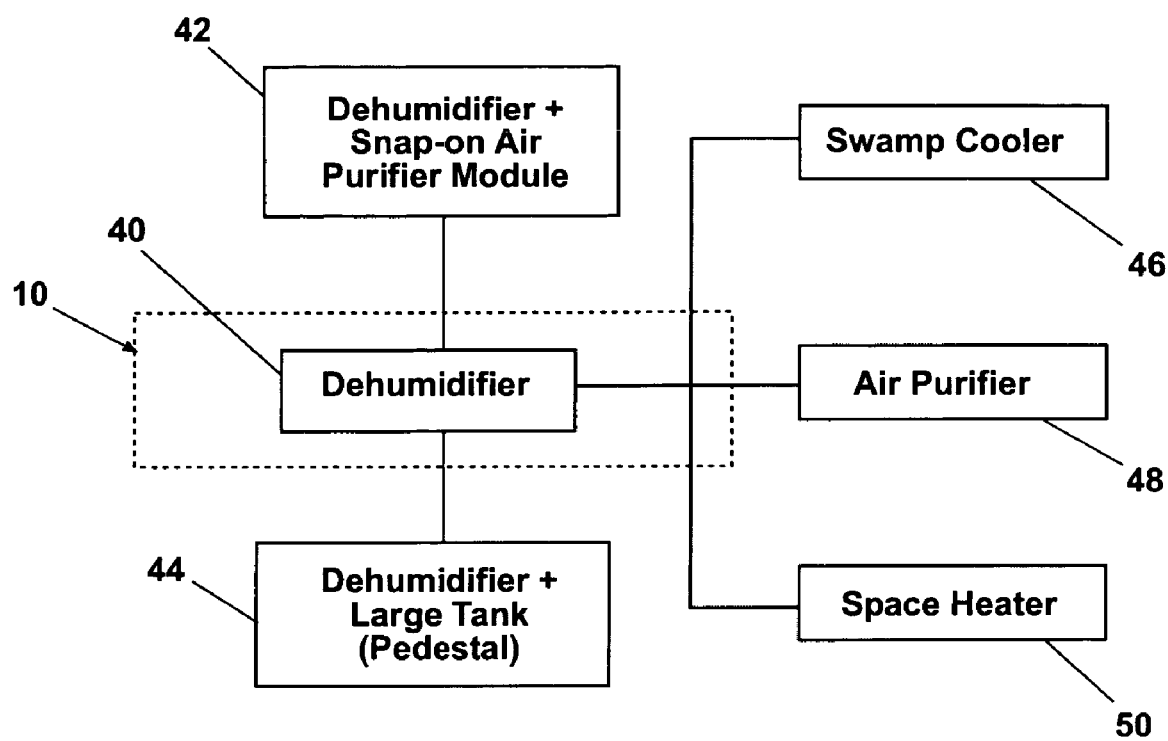
FIG. 2 is a schematic illustration of a conceptual design for the modular portable air treatment device according to the invention.

The modular portable air treatment device 10 is described with respect to an exemplary embodiment comprising a dehumidifier. Modularity of the device 10 enables the device 10 to be readily assembled as one of several selected devices, such as a dehumidifier, an air cleaner, a swamp cooler, a space heater, and the like, wherein the devices share many common features, such as an air flow system. Referring to FIG. 2, the modularity concept is shown schematically as comprising a base device 10 assembled as a dehumidifier 40. The basic dehumidifier 40 can be selectively enhanced with a modular auxiliary air cleaner module 42 attached to the dehumidifier 40 through suitable fasteners, snaps, or an interference fit. Alternatively, the basic dehumidifier 40 can be selectively enhanced with a modular auxiliary condensate collection tank 44.

The base device 10 can also comprise a swamp cooler 46, an air cleaner 48, or a space heater 50. The air cleaner 48, for example, can be selectively enhanced with the addition of a modular dehumidifier, or a modular space heater. Any combination of base device and modular enhancement can be readily provided.

Figure 3:
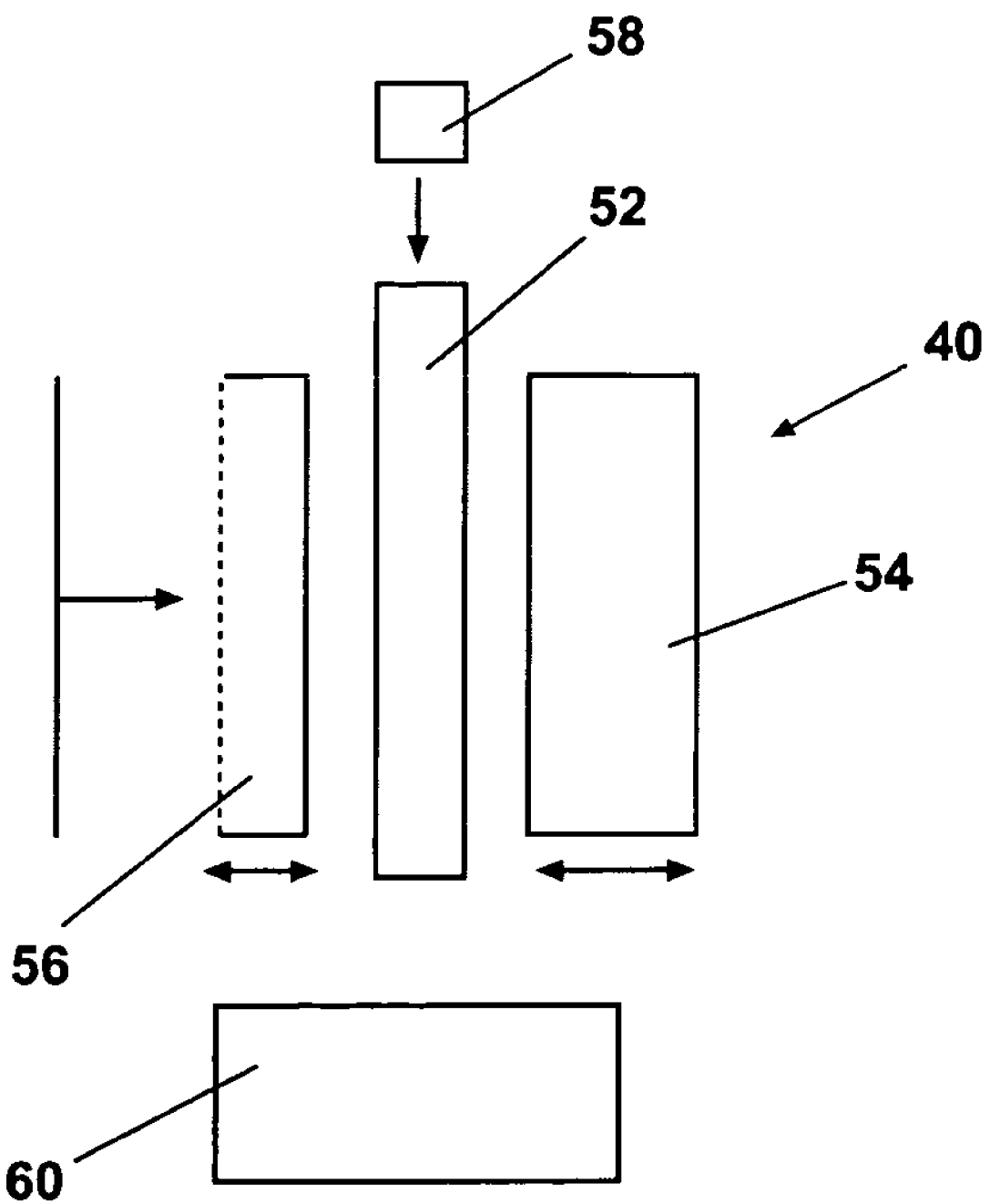
FIG. 3 is a schematic illustration of a first organizational configuration for the modular portable air treatment device according to the invention.
Figure 4:
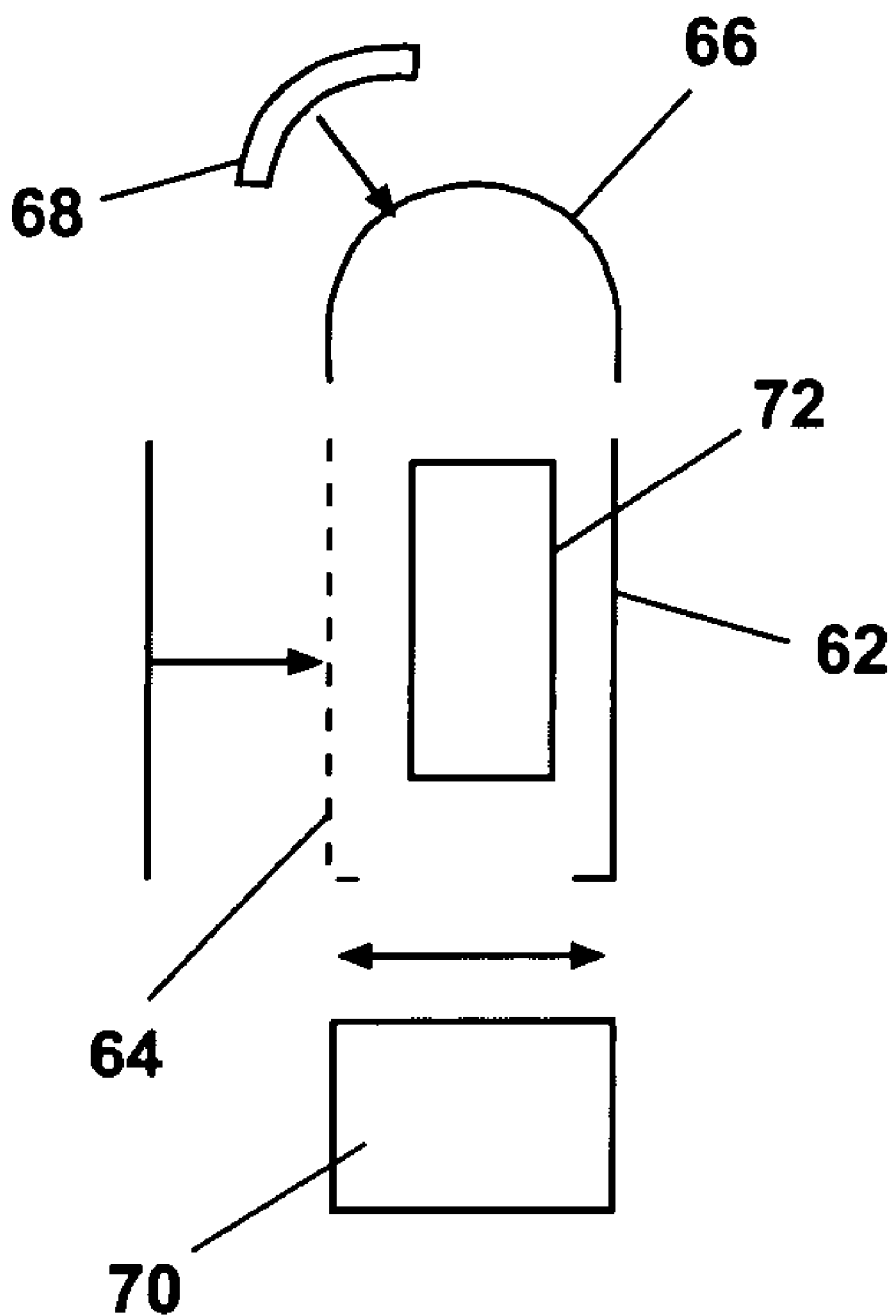
FIG. 4 is a schematic illustration of a second organizational configuration for the modular portable air treatment device according to the invention.

As illustrated schematically in FIGS. 3 and 4, the modularity can be accomplished in different ways. For example, as illustrated in FIG. 3, an air system 52 comprising a crossflow blower and an air flow housing can be attached to a mainframe or chassis in the interior of the device. A rear module and/or housing 54 can be attached to the mainframe/chassis to provide, for example, dehumidification, air cleaning, or to simply enclose the rear of the device. A front module/housing 56 can also be attached to the mainframe/chassis opposite the rear module/housing 54 to enclose the front of the device, or to provide, for example, air filtration, swamp cooling, or the like. A control module 58 can be attached to the mainframe/chassis and interconnected with the operating components for controlling operation of the device. The control module 58 can be provided based upon a selected combination of operations, e.g. dehumidification, air cleaning, and space heating, associated with a particular device. Finally, a base module 60 can be provided. For a dehumidifier, the base module 60 can comprise a condensate collection bucket. For an air cleaner, the base module 60 can comprise an endless loop filter. For a humidifier, the base module 60 can comprise a water supply reservoir.

Alternatively, as illustrated in FIG. 4, modularity can be accomplished by incorporating a common assembly 72, such as an air system, into a mainframe module. This module can then integrate with a rear module/housing 62 and a front module/housing 64 comprising additional functionality such as air cleaning, dehumidification, and the like. A cap piece 66 can be integrated with front and rear housing pieces to complete the enclosure and support a control module 68. In a system comprising vertical modularity and varying height, a single common cap piece 66 can be utilized regardless of the height of the device, and adapted to accept a control module 68 selected for a particular combination of functionalities. Finally, a base module 70 provides additional functionality dependent upon the particular device. For a dehumidifier, the base module 70 can comprise a condensate collection bucket. For an air cleaner, the base module 70 can comprise an endless loop filter. For a humidifier, the base module 70 can comprise a water supply reservoir.

Figure 5:
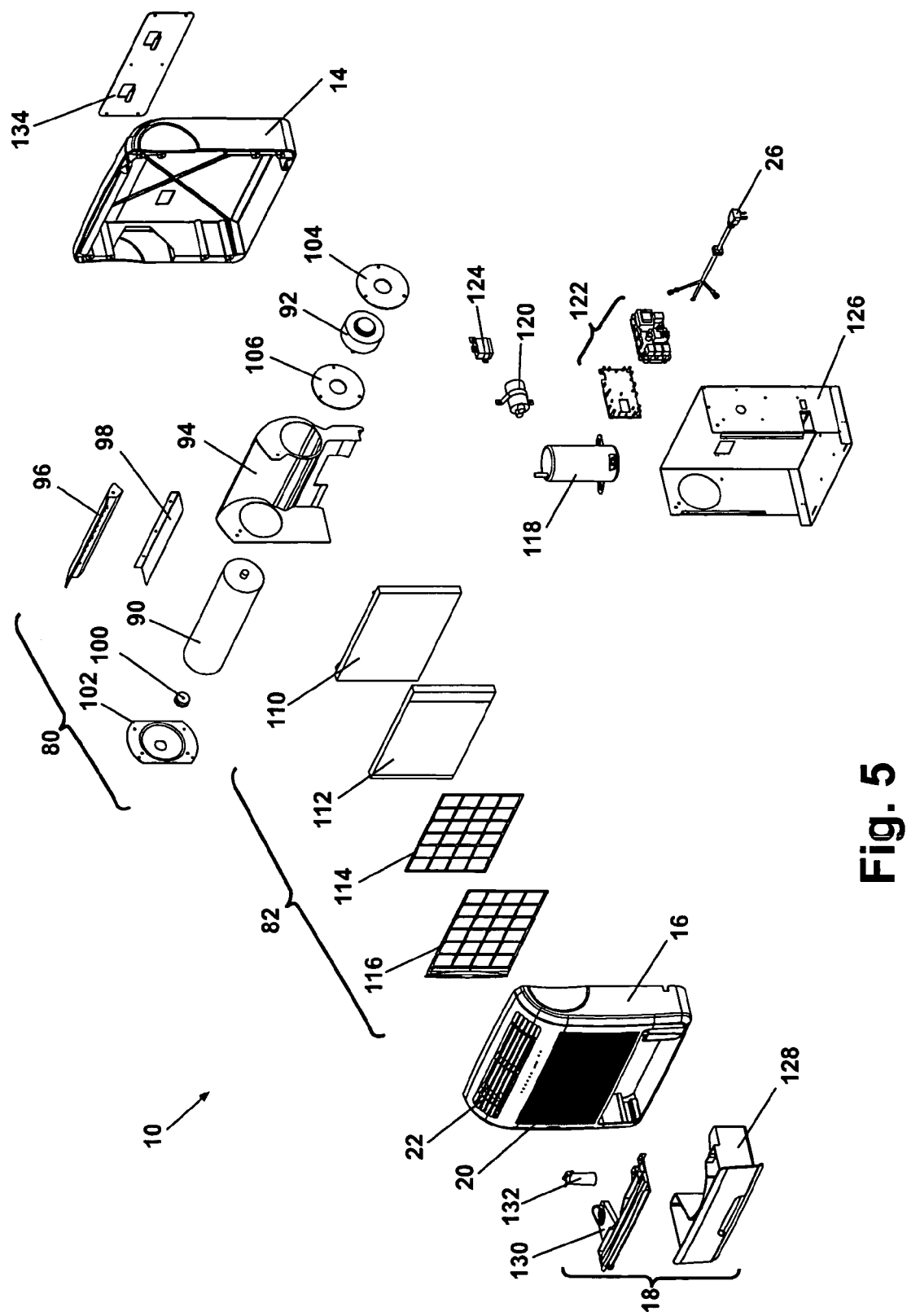
FIG. 5 is an exploded view of the dehumidifier illustrated in FIG. 1.

Referring now to FIG. 5, the modular portable air treatment device 10 is shown as a dehumidifier in an exploded view. The air treatment device 10 comprises an air flow module 80, which serves as a common base module, and a heat exchanger module 82, which serves as a specific air treatment appliance module, both of which are enclosed within the housing 12. This configuration follows the configuration illustrated schematically in FIG. 4. The air flow module 80 is a common base module in that it can be utilized in a dehumidifier, an air cleaner, a swamp cooler, a space heater, and the like, in combination with a heat exchanger module for the dehumidifier, an electrostatic precipitator module for the air cleaner, a wicking element for the swamp cooler, or a heating element for the space heater. A condensate collection bucket assembly 18 is illustrated inserted into the modular portable air treatment device 10 below the front grille 20.

The air flow module 80 comprises a crossflow blower 90, a blower motor 92, a scroll 94, a pillar tongue 96, a bracket 98, a blower bearing 100, a bearing housing 102, an outer motor plate 104, and an inner motor plate 106. The heat exchanger module 82 comprises a condenser 110, an evaporator 112, a pair of optional air filters 114, 116, and a compressor 118. Additional operational and control devices 120, 122, 124 are illustrated and are operably interconnected with each other, the power plug 26, and the various operating devices. The control devices 120, 122, 124 are well-known devices and will not be further described herein. A chassis 126 supports and mounts the various components illustrated in FIG. 5. The condensate collection bucket assembly 18 comprises a condensate collection bucket 128, a cover 130, and a float 132. A wall mount bracket 134 can be mounted to a wall and is adapted for supporting the device 10 against a wall above the floor.

Figure 6:
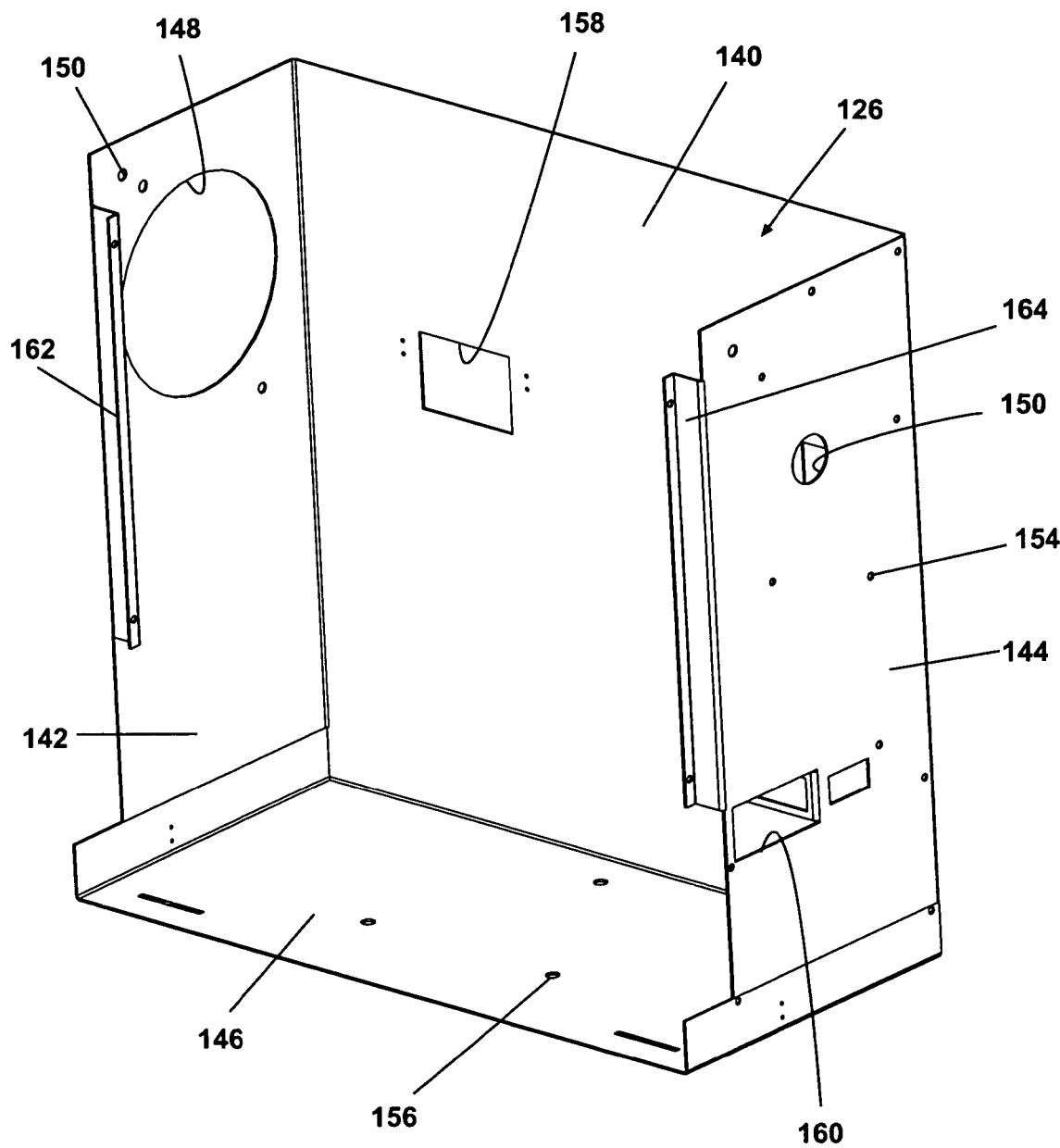
FIG. 6 is a perspective view of a chassis comprising a portion of the dehumidifier illustrated in FIG. 1.

Referring to FIGS. 5 and 6, the chassis 126 is a generally rectilinear, shell-like structure having a thin, plate-like back wall 140 extending orthogonally away from a thin, plate-like bottom wall 146. A pair of sidewalls 142, 144 extend orthogonally away from the back wall 140 and the bottom wall 146. The sidewall 142 is provided with an enlarged, circular blower opening 148 at an upper portion thereof. The sidewall 144 is provided with a circular motor shaft opening 150 in coaxial alignment with the blower opening 148. A plurality of apertures 152, 154, 156 are provided through the walls 142, 144, 146 for attachment and mounting purposes. Openings 158, 160 are also provided in the walls for routing of power cables, water lines, and the like. A pair of opposed, spaced-apart flanges 162, 164 extend inwardly from the sidewalls 142, 144 parallel to the back wall 140.

Figure 9:
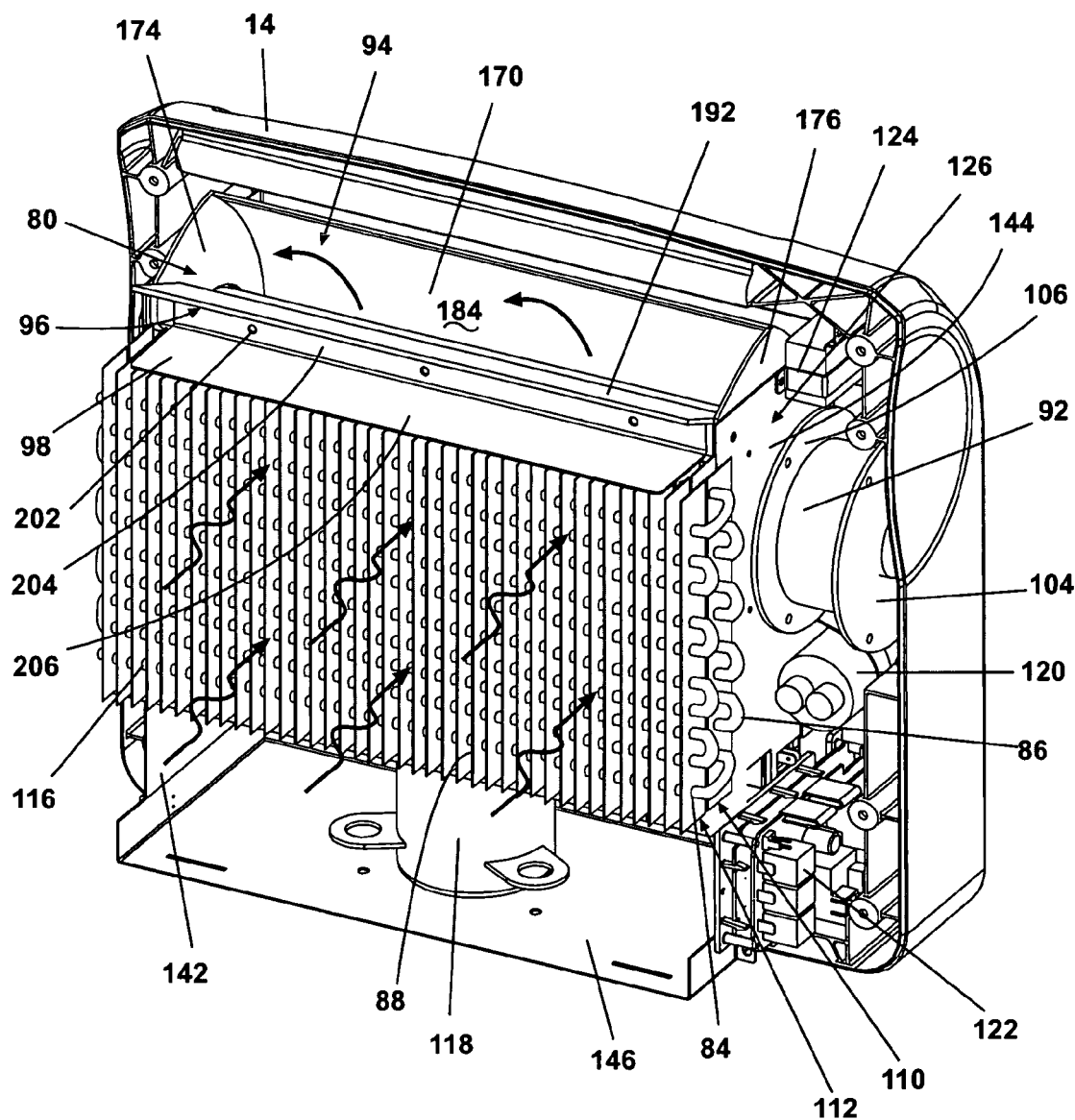
FIG. 9 is a perspective view of the dehumidifier illustrated in FIG. 1 with selected parts removed for clarity showing air flow through an evaporator and a condenser.
Figure 10:
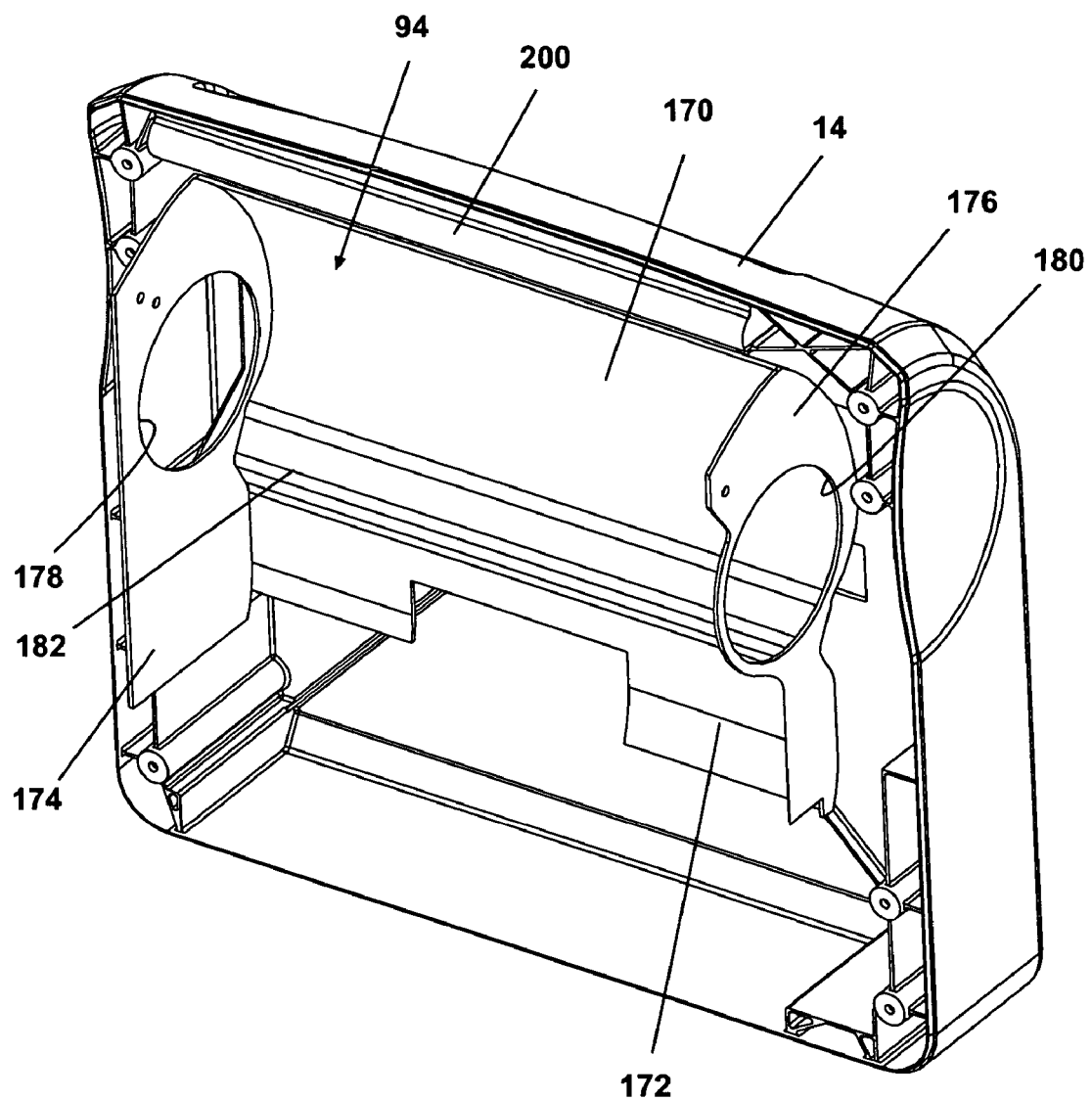
FIG. 10 is a perspective view of a scroll in relative position in the dehumidifier with selected parts removed for clarity.
Figure 11:
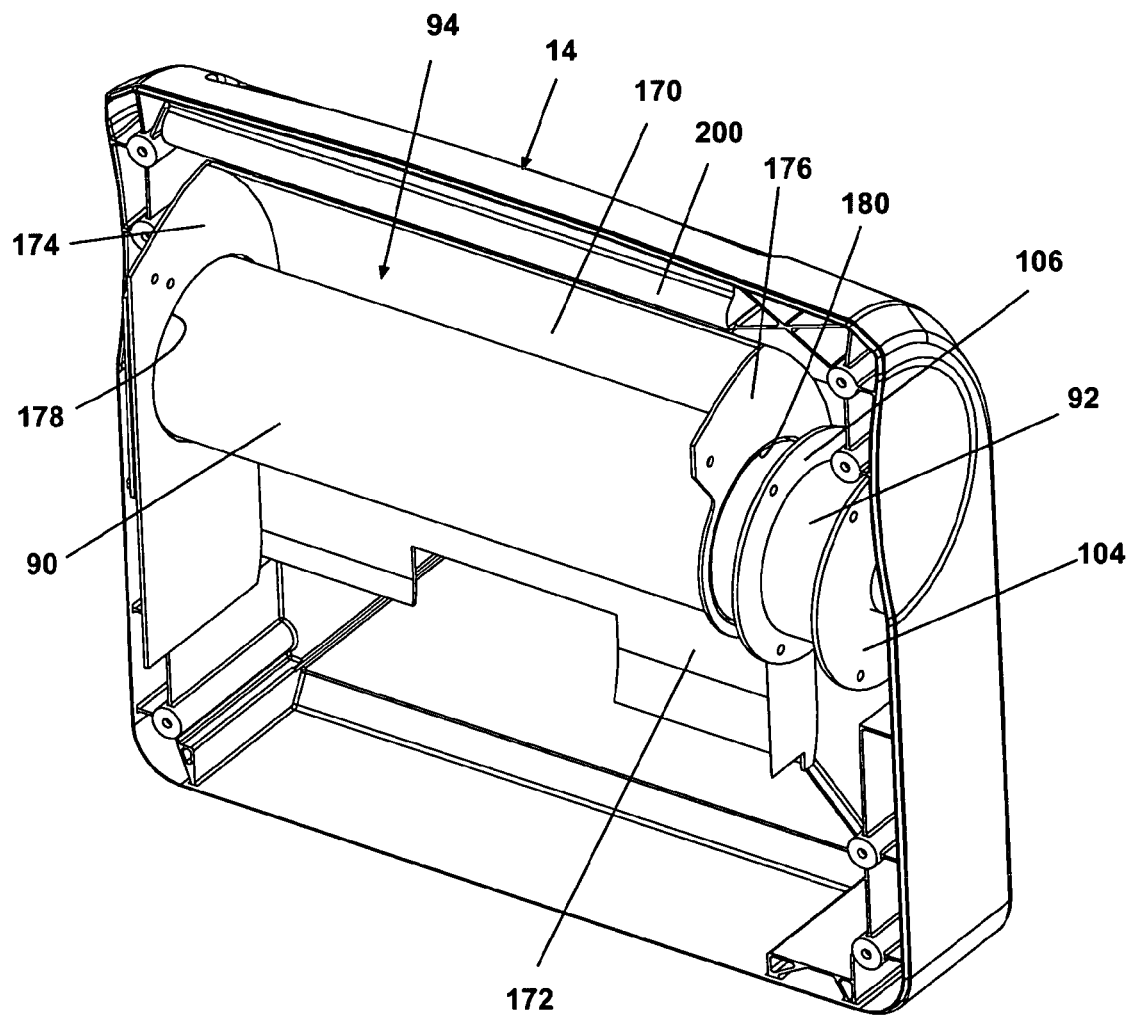
FIG. 11 is a perspective view of the scroll, a blower, and a blower motor in relative position in the dehumidifier with selected parts removed for clarity.
Figure 12:
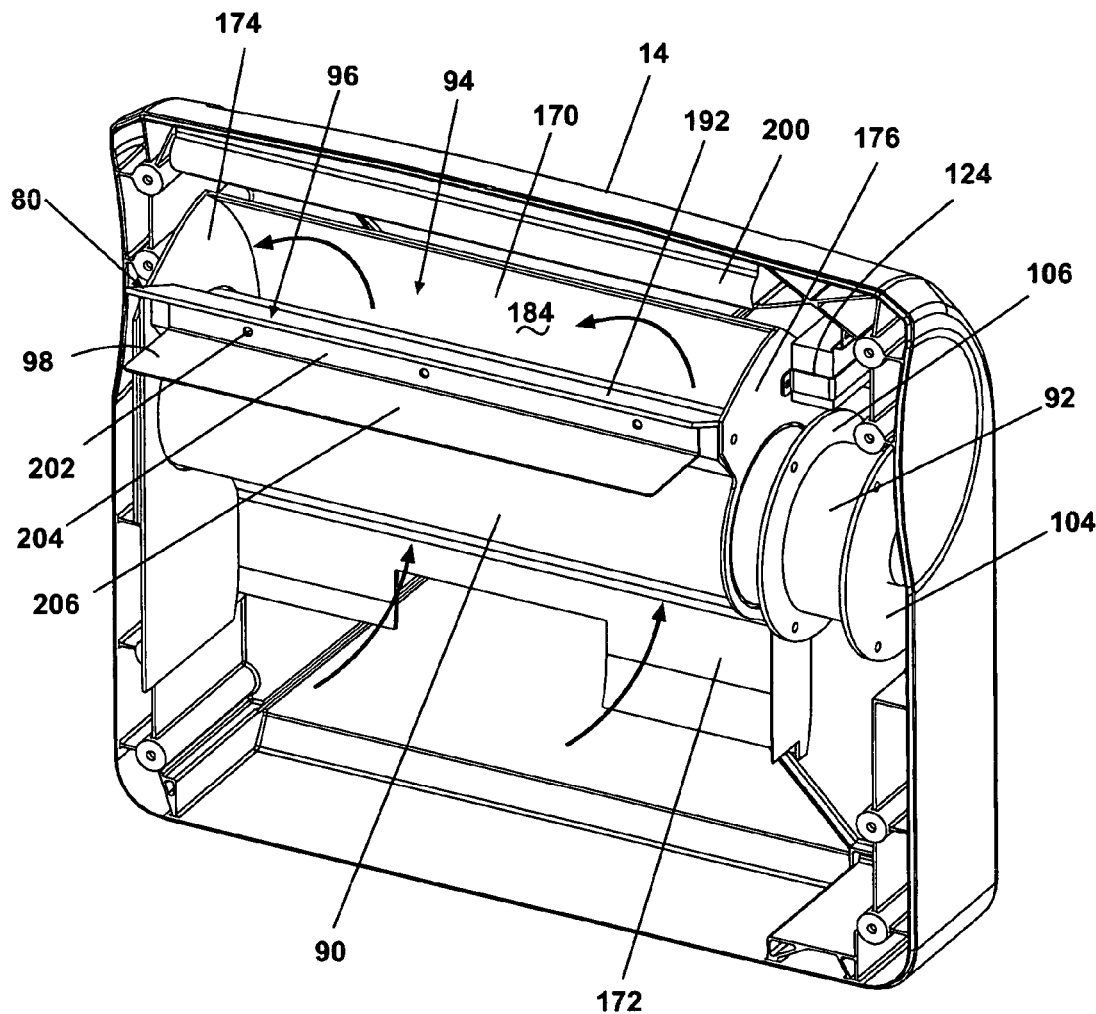
FIG. 12 is a perspective view of the scroll, the blower, the blower motor, a pillar tongue, and a bracket, in relative position in the dehumidifier with selected components removed for clarity, showing air flow through the assembly.

Referring now to FIGS. 5 and 7-14, the air flow module 80 will now be described. FIG. 9 illustrates the modular portable air treatment device 10 with the front housing 16 removed for clarity and showing air flow through the air flow module 80. FIGS. 10-12 illustrate the relative positioning of the scroll 94, the blower 90, the blower motor 92, the pillar tongue 96, and the bracket 98 in the rear housing 14. In FIGS. 10-12, the chassis 126 and other components have been removed for clarity.

Figure 13:
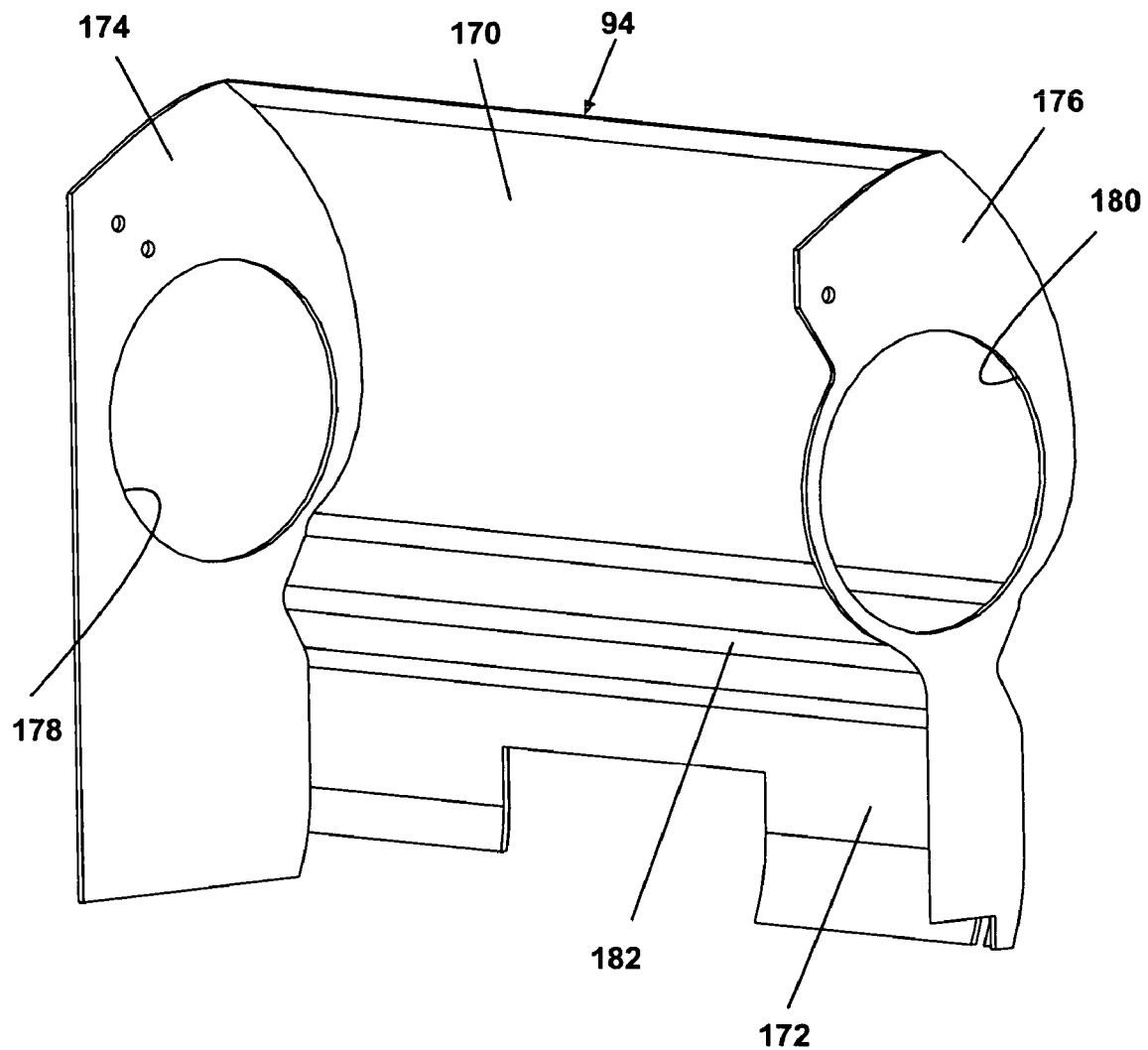
FIG. 13 is a perspective view of the scroll comprising a portion of the dehumidifier illustrated in FIG. 1.

The crossflow blower 90 is a generally conventional cylindrical air movement device oriented to rotate about a horizontal axis. The blower 90 is coaxially connected to the blower motor 92 for rotation of the blower 90 with rotation of the blower motor 92. A scroll 94, illustrated in FIG. 13, is an irregularly-shaped, shell-like structure comprising an arcuate back wall 170 adapted to partially curve around the crossflow blower 90. The arcuate back wall 170 terminates in a skirt 172 through a transition section 182 having a somewhat V-shaped cross-section. A pair of opposed, parallel sidewalls 174, 176 extend orthogonally away from the back wall 170, the skirt 172, and the transition section 182, at opposite ends thereof. The sidewalls 174, 176 are provided with enlarged circular blower openings 178, 180, respectively, in coaxial alignment and somewhat concentrically with the back wall 170. The blower openings 178, 180 are sized to slidably receive the blower 90.

Figure 7:
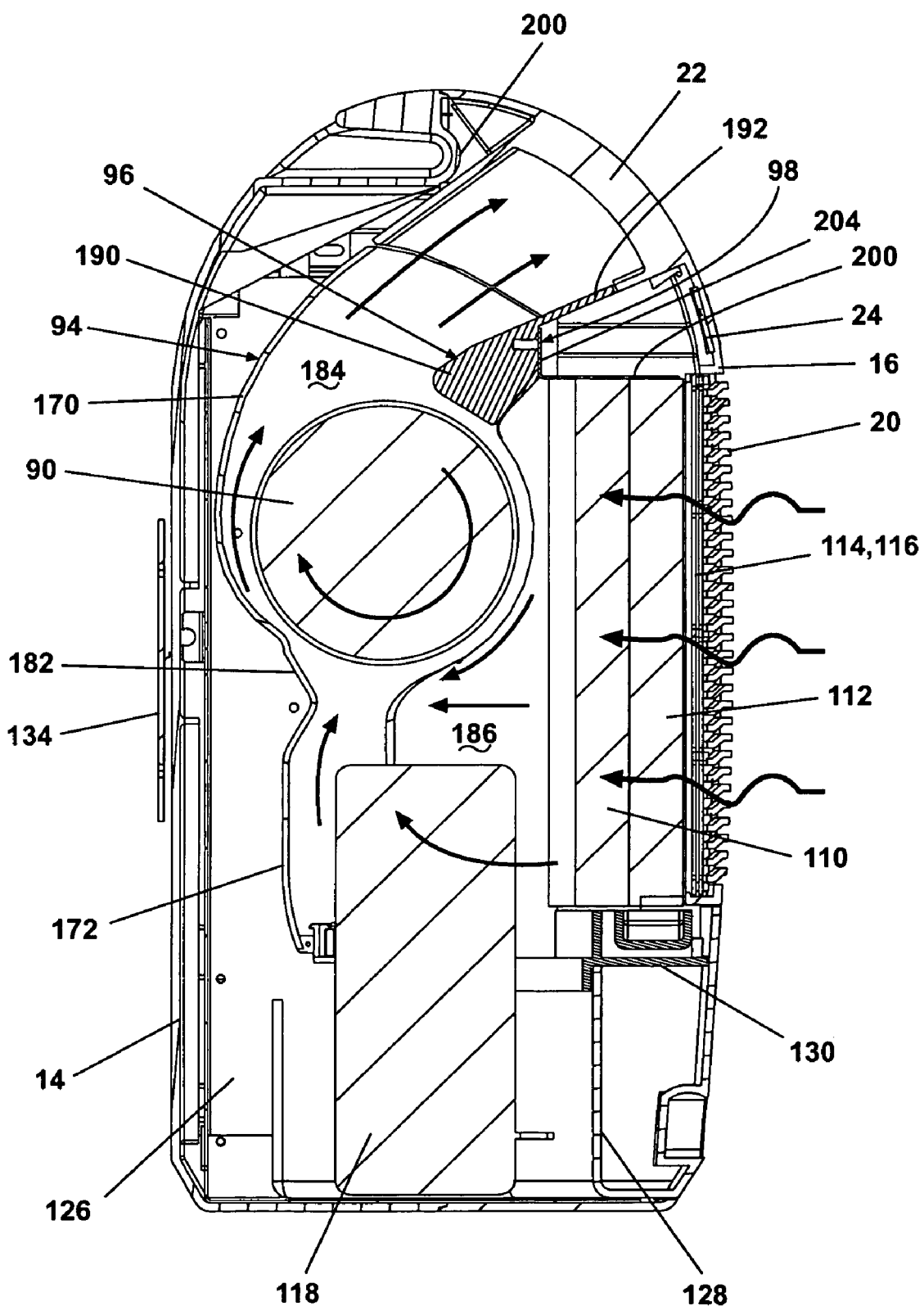
FIG. 7 is a sectional view of the dehumidifier taken along the view line 7-7 of FIG. 1.
Figure 8:
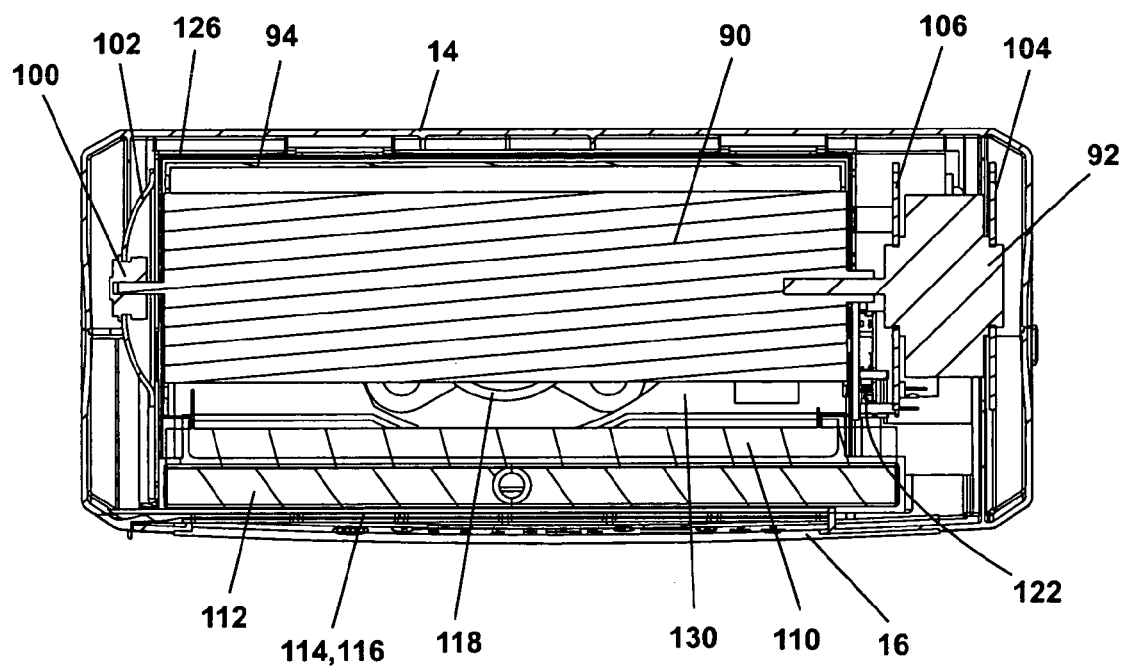
FIG. 8 is a sectional view of the dehumidifier taken along the view line 8-8 of FIG. 1.
Figure 14:
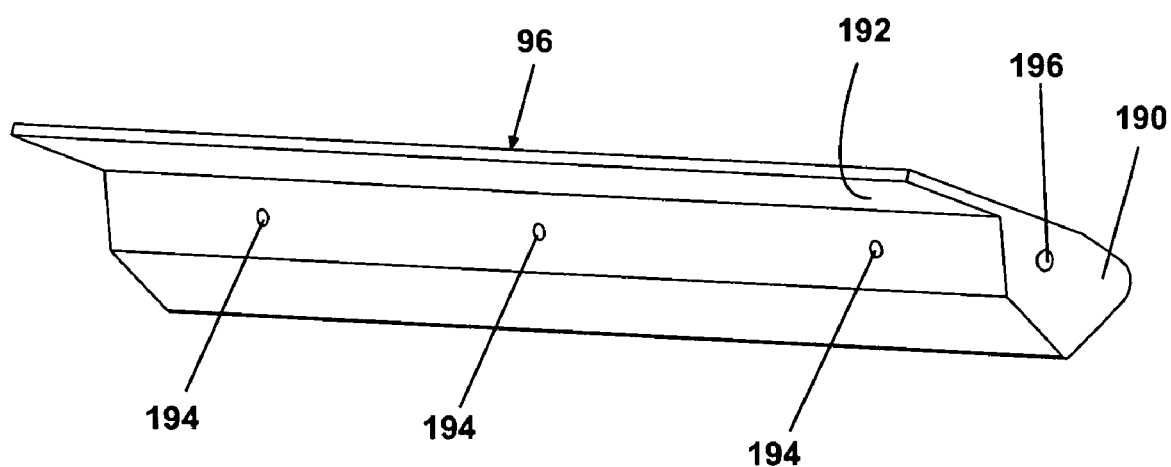
FIG. 14 is a perspective view of the pillar tongue comprising a portion of the dehumidifier illustrated in FIG. 1.

Referring specifically to FIG. 14, the pillar tongue 96 in combination with the arcuate back wall 140 of the scroll 94 defines an upper air flow chamber 184 opening through the top grille 22, as illustrated in FIG. 7. The pillar tongue 96 is an elongated member having an irregular cross-section, and comprising a base portion 190 and a flange piece 192 extending away from the base portion 190. Mounting apertures 194 extend into the base portion 190 adjacent to the flange piece 192. Mounting apertures 196 also extend longitudinally into the base portion 190 at either end thereof. The pillar tongue 96 is adapted to be mounted between the sidewalls 174, 176 of the scroll 94 by suitable fasteners inserted through the sidewalls 174, 176 and into the apertures 196.

Referring again to FIGS. 5 and 7, the bracket 98 is an elongated, L-shaped member adapted for longitudinal attachment to the pillar tongue 96 by suitable fasteners inserted through a first leg 204 of the bracket 98 into the mounting apertures 194. As so attached, a second leg 206 of the bracket 98 will extend away from the base portion 190 of the pillar tongue 96, as illustrated in FIG. 7 to provide a mounting surface for the condenser 110 and the evaporator 112.

The blower 90 is inserted through the blower openings 178, 180 and rotatably supported at one end in the bearing 100, which is supported by the bearing housing 102. The bearing housing 102 is attached to the outside of the sidewall 142 of the chassis 126 so that the bearing 100 is coaxially aligned with the blower opening 148.

The circular motor plates 104, 106 are adapted with concentric apertures and oriented in parallel, coaxial juxtaposition for receiving the motor 92 therebetween. The assembled motor 92 and motor plates 104, 106 are attached to the outside of the sidewall 144 of the chassis 126 so that the motor 92 is coaxially aligned with the motor shaft opening 150, with the motor shaft extending therethrough, as illustrated in FIG. 7. Referring again to FIG. 7, the air flow module 80 defines an upper air flow chamber 184 extending generally from the blower 90 to the top grille 22 and a lower air flow chamber 186 extending generally from the condenser 110 to the blower 90.

Referring now to FIGS. 5, 7, 8 and 9, the heat exchanger module 82 will now be described. A heat exchanger comprises a condenser 110 and an evaporator 112. A generally conventional condenser 110 is adapted with suitable dimensions for integration into the modular portable air treatment device 10. Similarly, a generally conventional evaporator 112 is adapted with suitable dimensions for integration into the modular portable air treatment device 10. Preferably, the evaporator 112 is positioned upstream of the condenser 110 so that air drawn into the modular portable air treatment device 10 is first drawn through the evaporator 112, followed by the condenser 110. The condenser 110 and the evaporator 112 are fluidly connected in a well-known manner to the compressor 118, and fluidly separated by a well-known expansion valve (not shown) so that coolant flowing from the evaporator 112 undergoes expansion prior to entering the condenser 110.

Figure 9A:
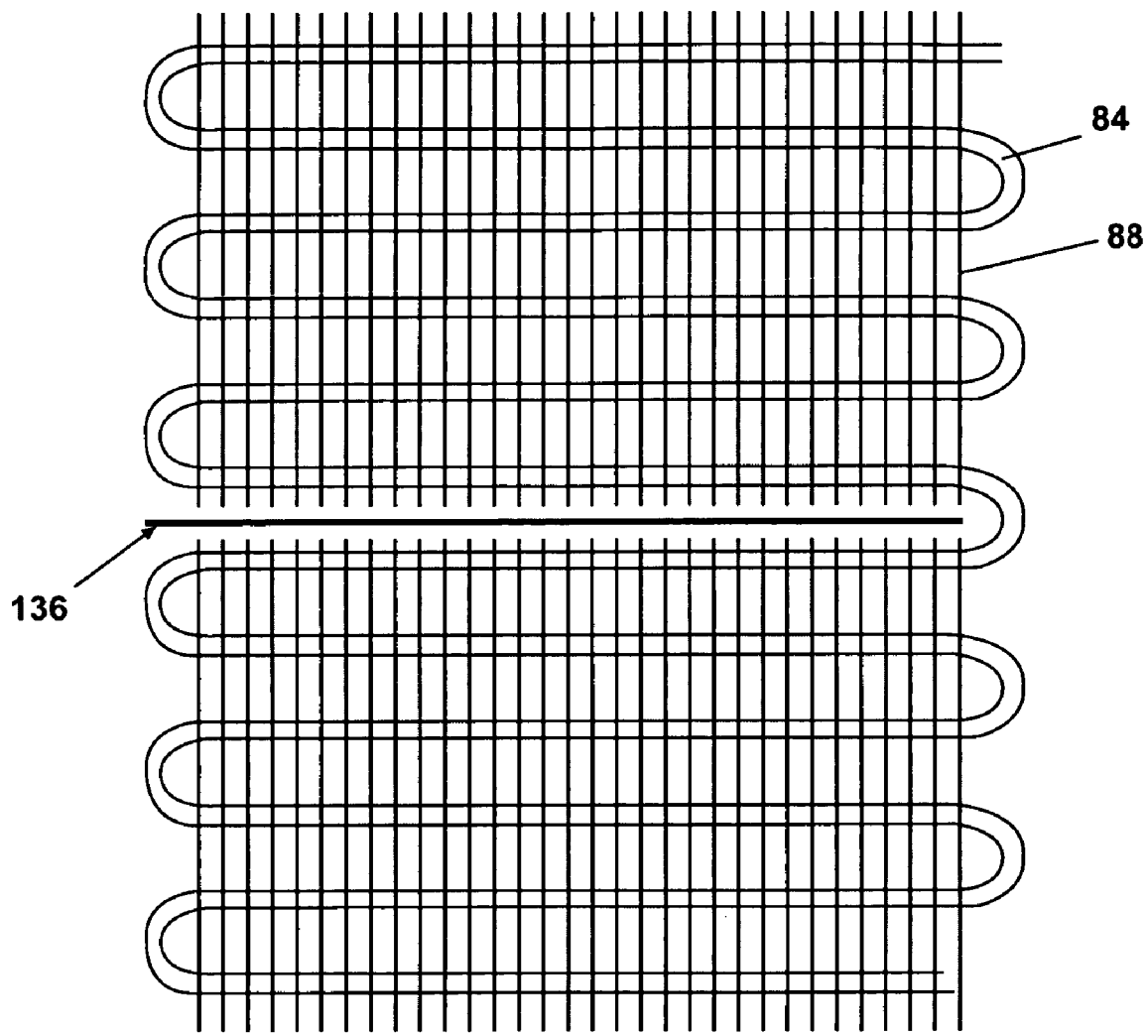
FIG. 9A is an enlarged view of a portion of the evaporator illustrated in FIG. 9 illustrating an alternate embodiment of the evaporator.

The evaporator 112 and the condenser 110 are illustrated as each comprising a sinuous tubular coil 84, 86, respectively, in a planar configuration having a plurality of well-known parallel fins 88 orthogonally intersecting the coil segments across the height of the coil 84, 86 for facilitating the dissipation of heat. As illustrated in FIG. 9A, the evaporator 112 can alternatively be configured with one or more periodically spaced horizontal condensate intercepting plates 136. The vertical fins 88 would be periodically interrupted into smaller sections to enable the condensate intercepting plates 136 to extend parallel to the evaporator coil segments. Condensate flowing downwardly under gravity along the fins would be intercepted by the condensate intercepting plates 136, which would then deliver the condensate laterally to a collection device for delivery to a condensate collection bucket.

Figure 9B:
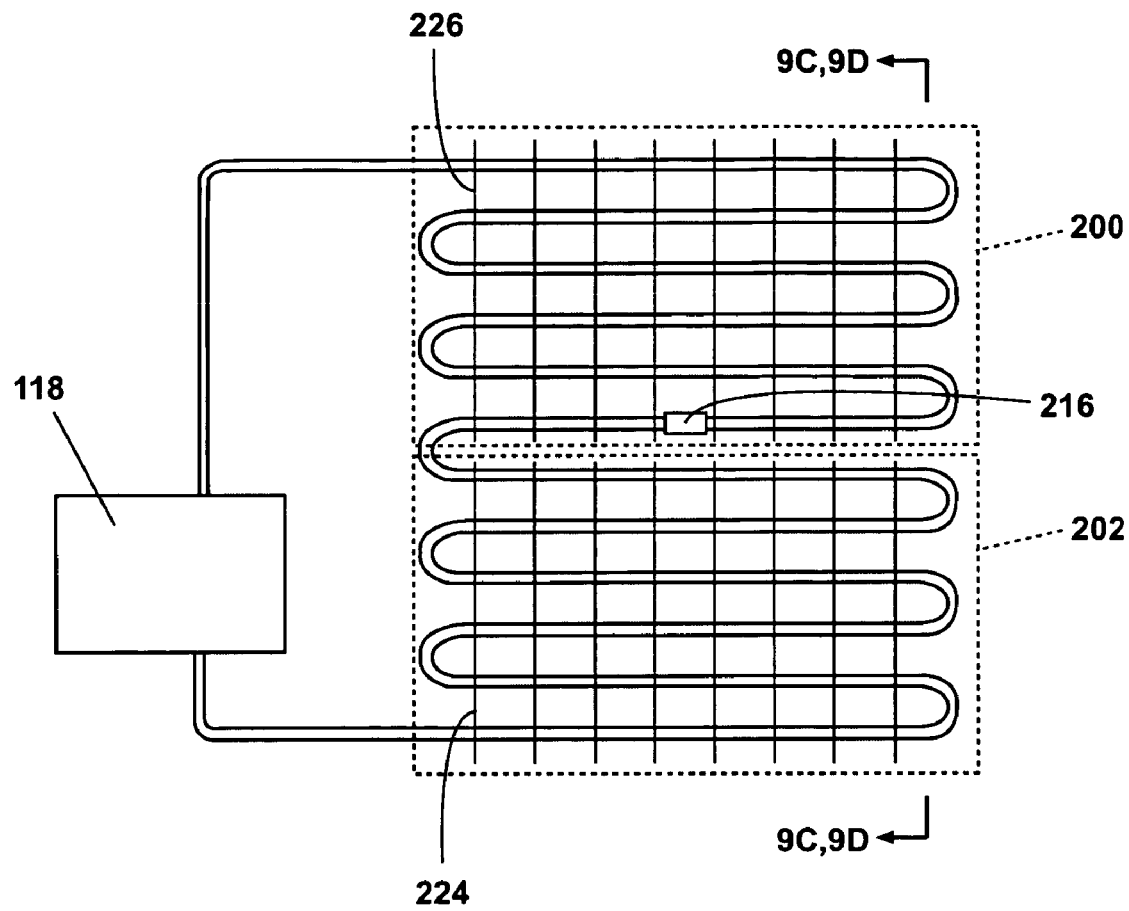
FIG. 9B is a schematic representation of an alternate embodiment of the evaporator and condenser illustrated in FIG. 9 comprising a single coil configured into separate circuits.

Alternatively, as illustrated in FIG. 9B, the condenser and the evaporator can be configured so that they are coplanar, and separated into a condenser circuit 200 and an evaporator circuit 202. In this configuration, both the condenser circuit 200 and the evaporator circuit 202 would be positioned side-by-side in the air stream, rather than front-to-back. Preferably, as illustrated in FIG. 9B, the condenser circuit 200 would be positioned above the evaporator circuit 202. The circuits 200, 202 would be separated by a conventional expansion valve 216 and fluidly connected to the compressor 118. This configuration will produce an equivalent stoichiometric output, as if one air stream passed through both the condenser 110 and the evaporator 112 in sequence.

Additionally, this configuration would enhance the efficiency of the evaporator circuit 202 in shedding condensate buildup on the evaporator fins 224 and, if present, condenser fins 226. A shorter fin length can be used for the evaporator circuit 202, thus enhancing of the flow of condensate off the fins 224. Furthermore, positioning the evaporator circuit 202 beneath the condenser circuit 200 would eliminate the flow of condensate from the evaporator fins 224 to the condenser fins 226. Shorter fins would prevent condensate from blocking air passages through the evaporator coil, and would reduce thermal resistance, thus improving the performance of the dehumidifier.

Figure 9C:
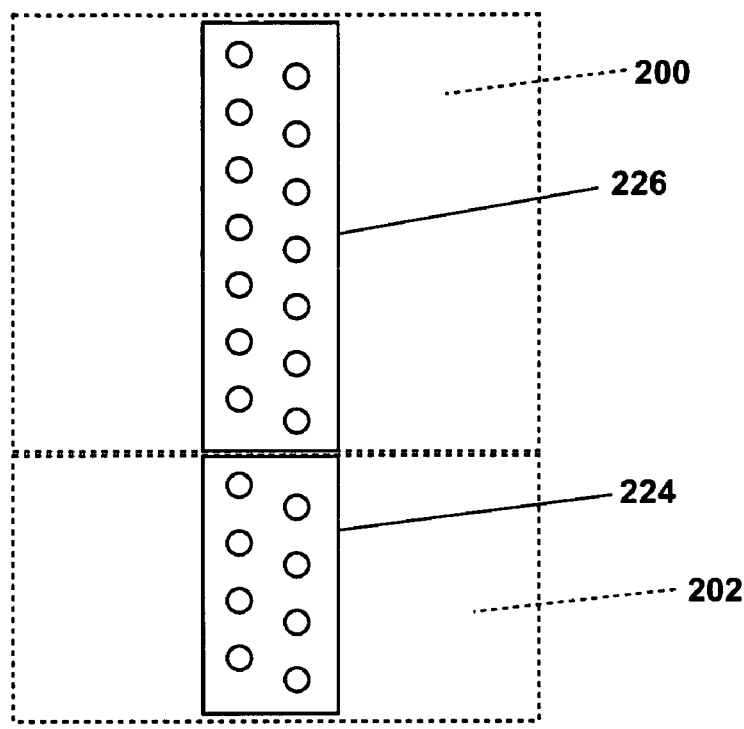
FIG. 9C is a schematic representation of a first configuration of the coil illustrated in FIG. 9B.
Figure 9D:
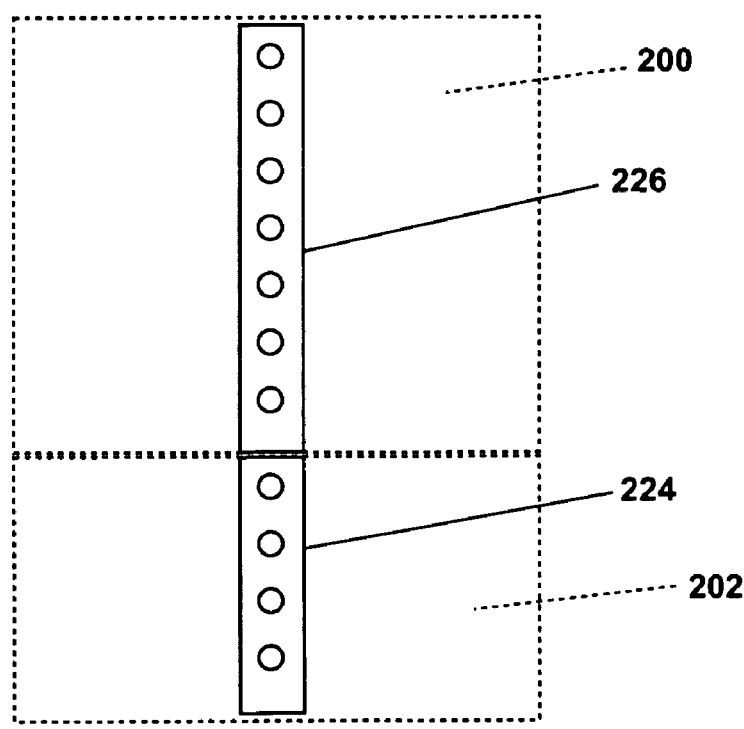
FIG. 9D is a schematic representation of a second configuration of the coil illustrated in FIG. 9B.

As illustrated in FIGS. 9C-D, the configuration illustrated in Figure B could comprise two or more rows of coils, or a single row of coils, depending upon the required heat exchange capabilities of the dehumidifier.

A pair of filters 114, 116 is illustrated comprising conventional fiber-type filters which are positioned exteriorly of the evaporator 112 behind the front grille 20. The air filters 114, 116 provide an air cleaning function to the air dehumidifying capabilities of the modular portable air treatment device 10. Alternatively, the filters 114, 116 can be eliminated, or replaced with an alternate filtration device, such as an ionic filter.

The compressor 118 is generally well-known and is adapted for the dehumidification components and process described herein. As illustrated in FIG. 9, the compressor 118 is mounted to the bottom wall 146 of the chassis 126 and extends upwardly partially into the lower air flow chamber 186 for positioning of the compressor 118 partially in the air flow through the dehumidifier. The compressor 118 is served by a suitable conventional compressor motor (not shown). The compressor 118 is also fluidly connected to the condenser 110 and the evaporator 112 in a well-known manner. Positioning of the compressor 118 as illustrated in FIGS. 7 and 9 provides two advantages. First, positioning the compressor in the air flow provides a cooling effect as air passes through the condenser 110 and the evaporator 112, around the compressor 118, and along the scroll 94. Second, positioning the compressor 118 upwardly behind the condenser 110 and the evaporator 112 reduces the overall height of the modular portable air treatment device 10, facilitating its portability and enhancing its unobtrusiveness.

Figure 15:
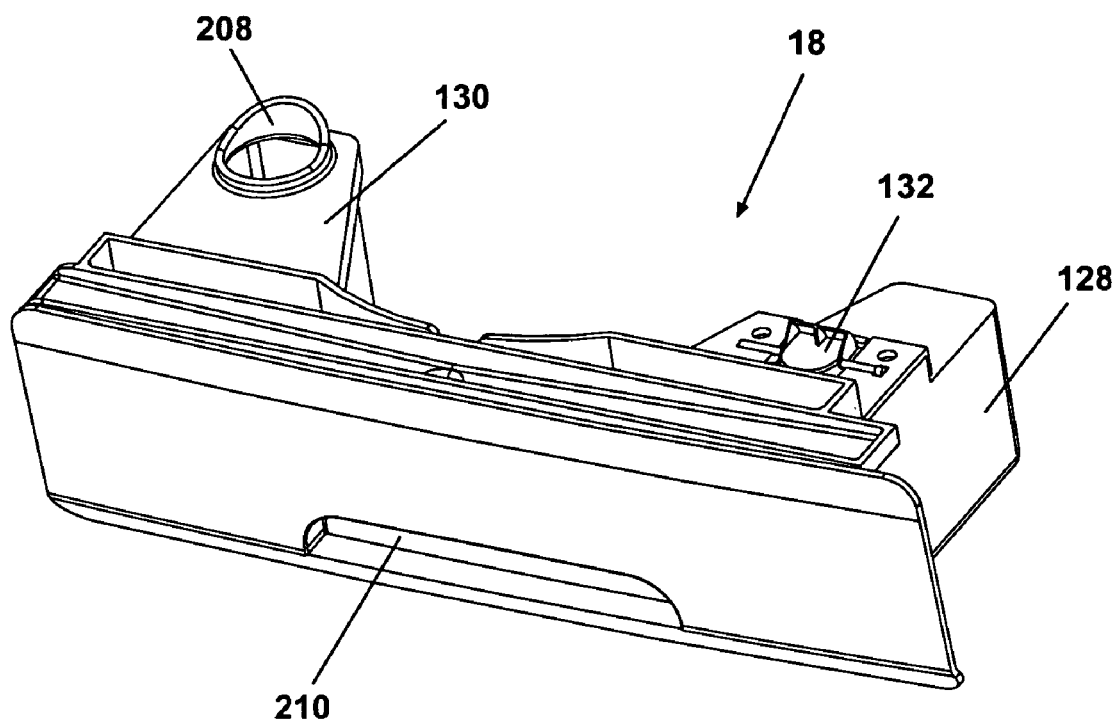
FIG. 15 is a perspective view of a condensate collection bucket assembly comprising a portion of the dehumidifier illustrated in FIG. 1.
Figure 16:
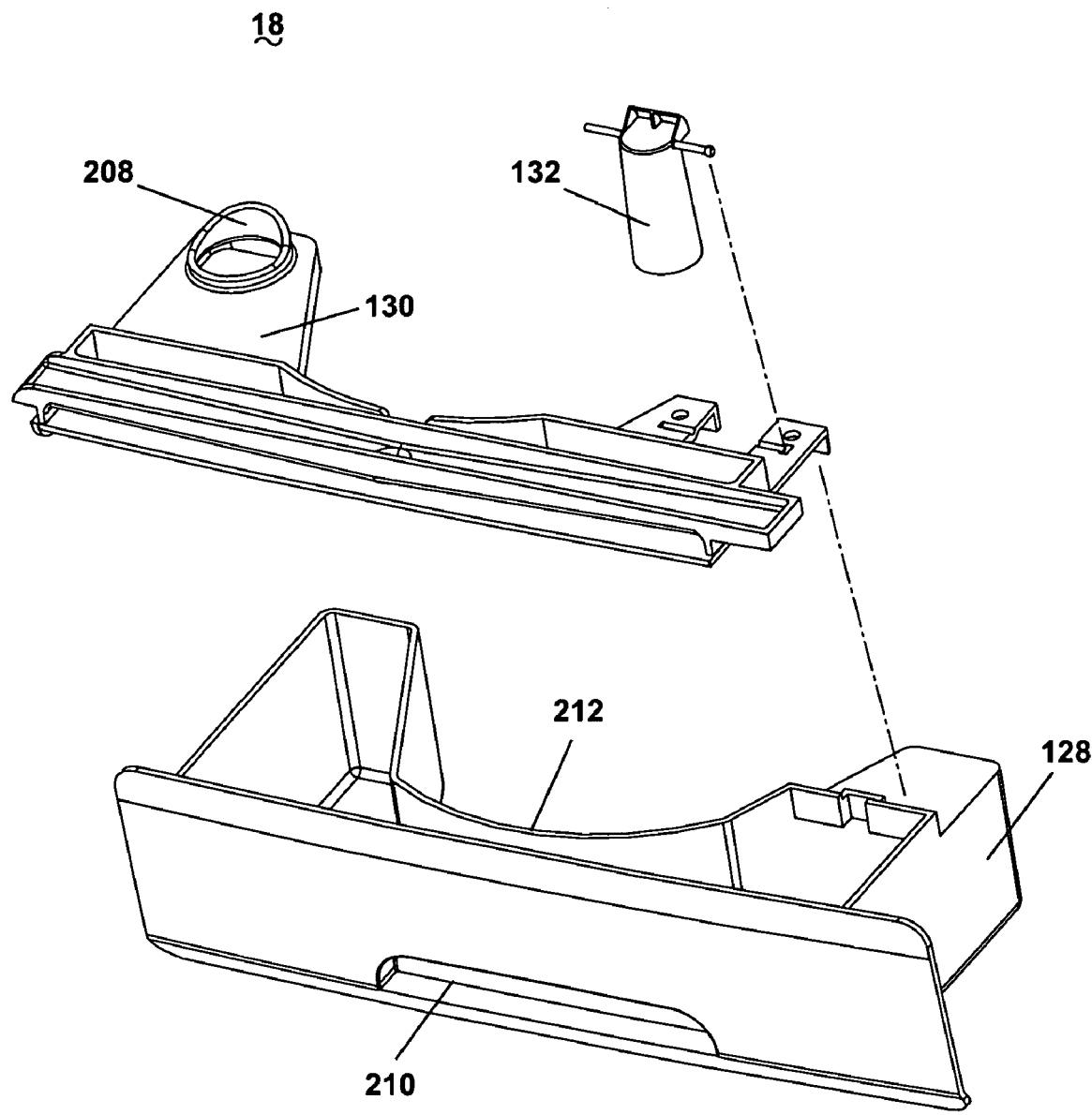
FIG. 16 is an exploded view of the condensate collection bucket assembly illustrated in FIG. 15.

Referring now to FIGS. 15 and 16, the condensate collection bucket assembly 18 comprises a condensate collection bucket 128, a cover 130 and a float 132. The condensate collection bucket 128 is a container-like body having an arcuate inner wall 212 adapted for wrapping around the compressor 118 when the condensate collection bucket assembly 18 is installed in the device 10 as illustrated in FIG. 1. The cover 130 is provided with a condensate inlet port 208 for flow of condensate from the evaporator 112. The float 132 is operationally connected in a conventional manner to the control system for the device 10 so that the device 10 will be automatically shut off when the condensate level in the condensate collection bucket 128 reaches a preselected height to avoid overflow of condensate from the condensate collection bucket 128.

As illustrated in FIGS. 7 and 9, the air flow module 80 can be preassembled in the chassis 126 for ready installation in the housing assembly 12. The blower 90 would be installed in the scroll 94 which would then be mounted in the chassis 126 with one end supported by the bearing 100 and the other end attached to the blower motor 92. The blower motor 92 would be mounted to the chassis 126 through the motor plates 104, 106 as previously described. The pillar tongue 96 and the bracket 98 would have been previously attached to the scroll 94 prior to installation of the scroll 94 in the chassis 126. The device 10 would then be ready for installation of further operational modules depending upon whether the device 10 was to be used as a dehumidifier, an air cleaner, a swamp cooler, or a combination of one or more of these and other modules. In the example described herein, operation of the device 10 as a dehumidifier would require the installation of the compressor 118, the condenser 110, the evaporator 112, and the filters 114, 116, utilizing the flanges 162, 164 on the chassis 126 for mounting. Suitable control devices 120-124 would then be installed depending upon the various functionalities integrated into the device 10.

As illustrated in FIG. 7, operation of the blower 90 will cause air to be drawn through the front grille 20, the filters 114, 116, the evaporator 112 and the condenser 110 for removal of moisture from the air. The air will then be drawn around the bottom of the blower 90 along the skirt 172 and the back wall 170 to exit through the top grille 22. With other devices, such as an air cleaner, the air flow will remain essentially the same, with air drawn into the front of the device 10, around the bottom of the blower 90 along the skirt 172 and the back wall 170 to exit through the top grille 22.

Figure 17:
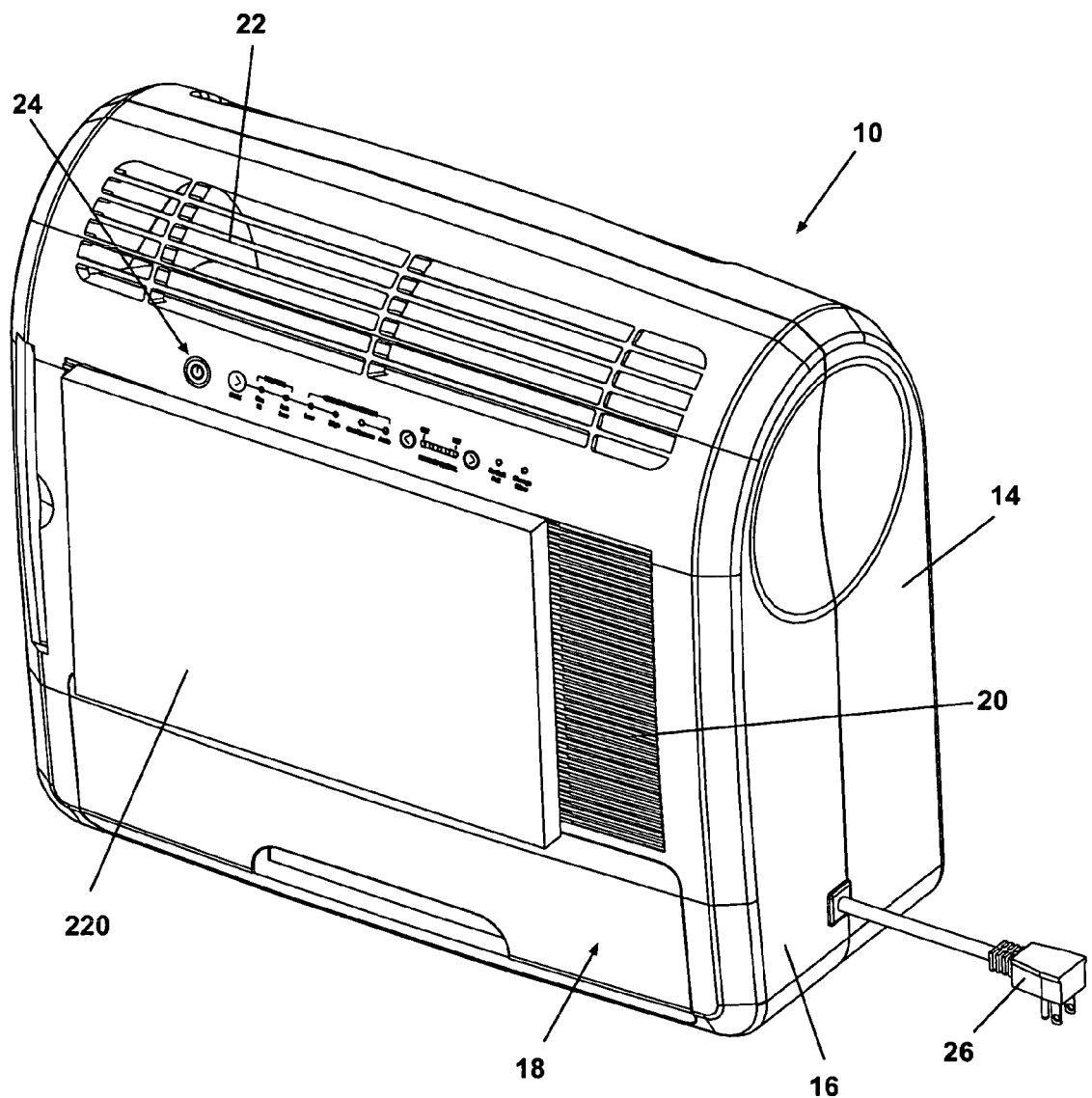
FIG. 17 is a perspective view of an embodiment of the dehumidifier illustrated in FIG. 1 with an auxiliary external filter attached to the front of the humidifier to intercept the air stream.

FIG. 17 illustrates the modular portable air treatment device 10 having an auxiliary external snap-on filter 220 attached to the front of the housing assembly 12 along the front grille 20. The filter 220 can filter and/or clean the air using any of the currently known techniques. For example, the filter element could be a traditional fiber or foam filter, or a HEPA filter. It also could be an ionic filter, such as a passive or active electrostatic precipitator.

The modularity of the modular portable air treatment device 10 enables selected air treatment devices to be configured around a common device, such as the air flow module 80. Selected modules having different functionalities can be added to the air flow module 80 to provide an air treatment device having specific features. Examples of such modules will now be described.

Figure 18C:
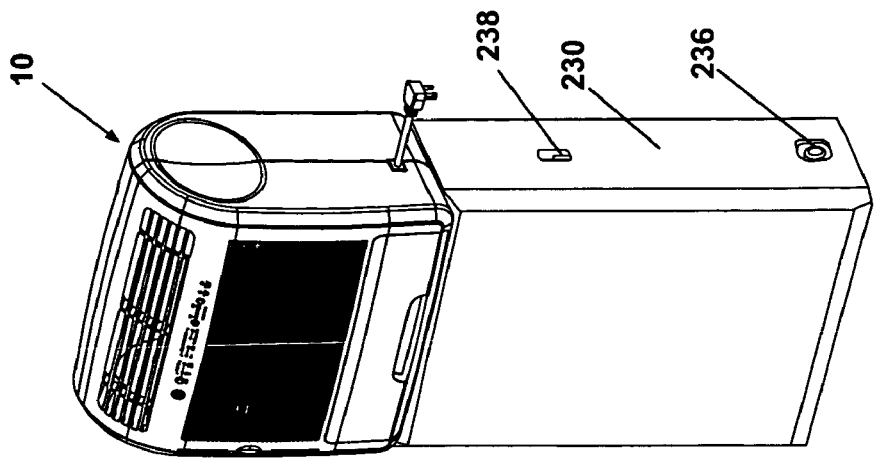
FIGS. 18A-C are perspective views of an auxiliary condensate container for use with the dehumidifier illustrated in FIG. 1.
Figure 18B:
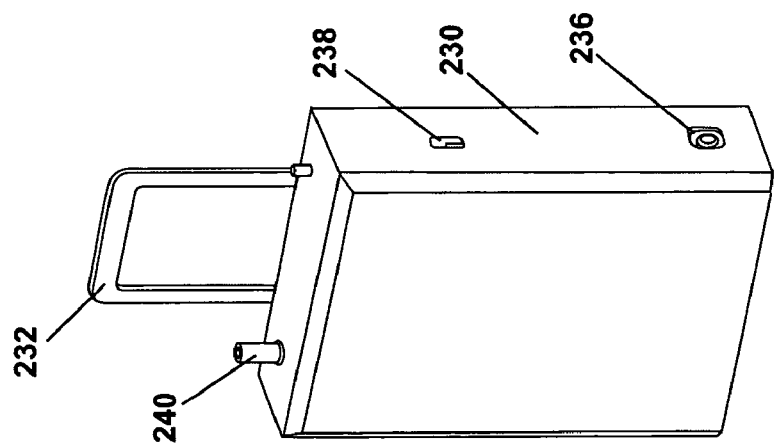
Figure 18A:
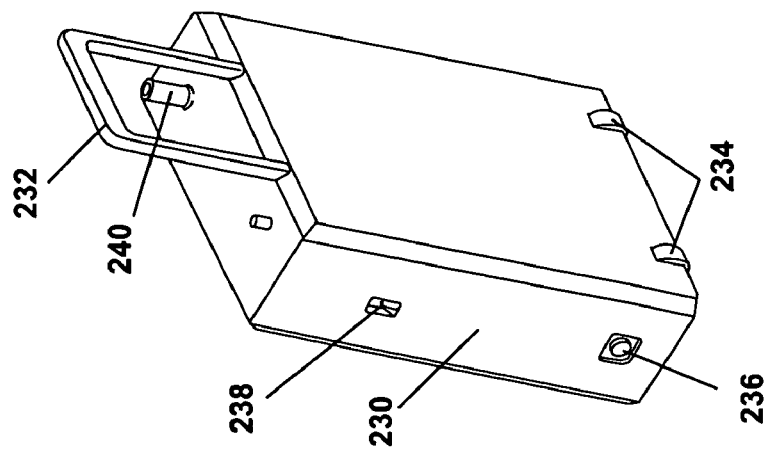

Referring now to FIGS. 18A-C, an auxiliary module in the form of a condensate bucket 230 is illustrated for increasing the condensate storage capacity of the modular portable air treatment device 10. The auxiliary condensate bucket 230 is illustrated as a generally rectilinear device, although the configuration of the device is not so limited. Preferably, the device will have a footprint approximately equal to the footprint of the modular portable air treatment device 10, as illustrated in FIG. 18C.

The auxiliary condensate bucket 230 is provided with a handle 232 and wheels 234 for ease in maneuvering. The handle 232 can also serve as a lateral support against the back of the air treatment device 10. The auxiliary condensate bucket 230 can also be provided with a drain connection 236 for connecting to an external drain outlet. The auxiliary condensate bucket 230 can also be provided with an internal pump discharging to a pump outlet 238. An inlet 240 extends through a top wall of the auxiliary condensate bucket 230 for fluid communication with the air treatment device 10. It is anticipated that the air treatment device 10 would comprise a mating inlet having a suitable valve for comparably engaging the inlet 240.

Figure 19:
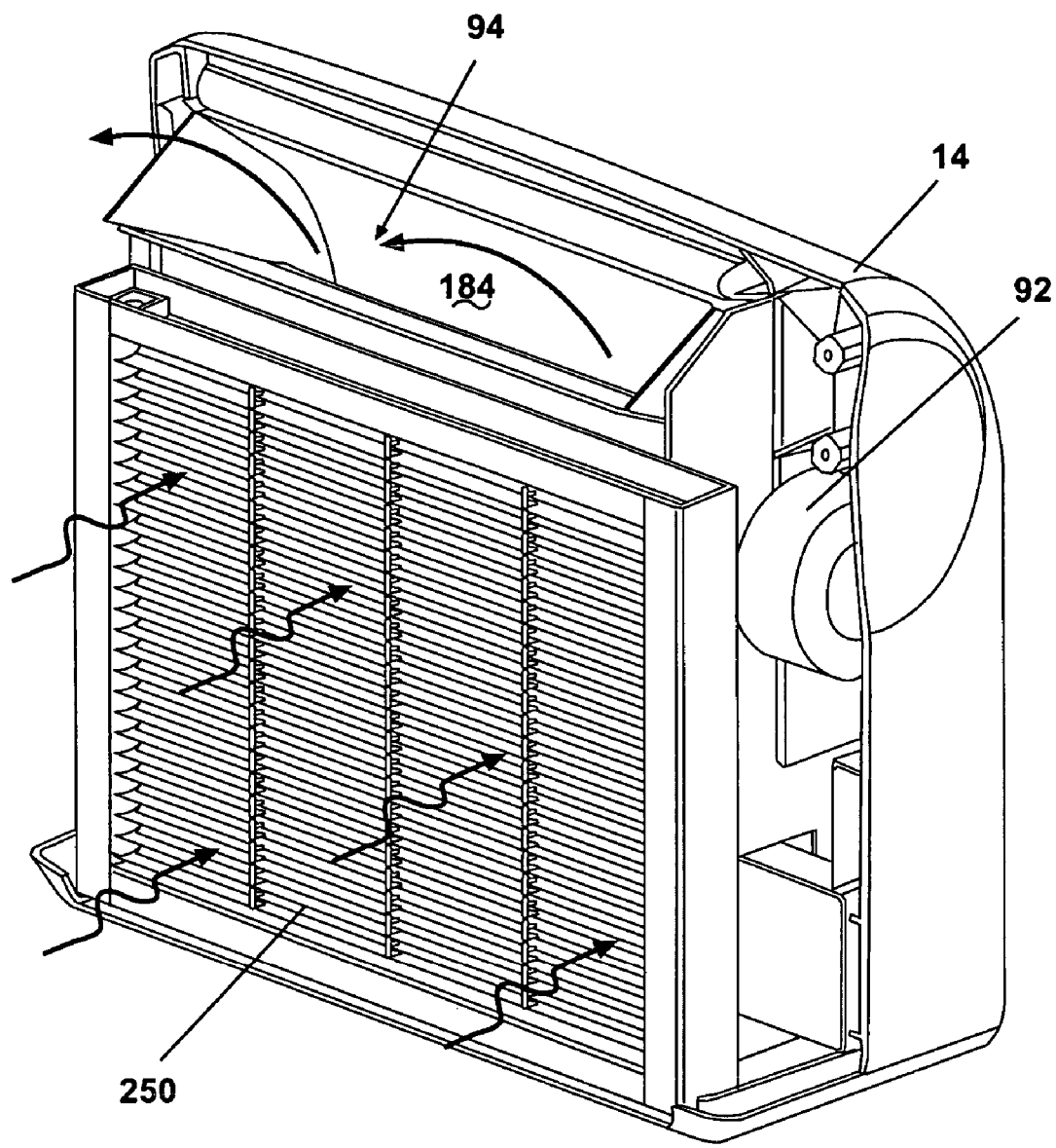
FIG. 19 is a perspective view of a second embodiment of the modular portable air treatment device according to the invention comprising an air cleaner with a portion of an external housing removed for clarity.
Figure 20:
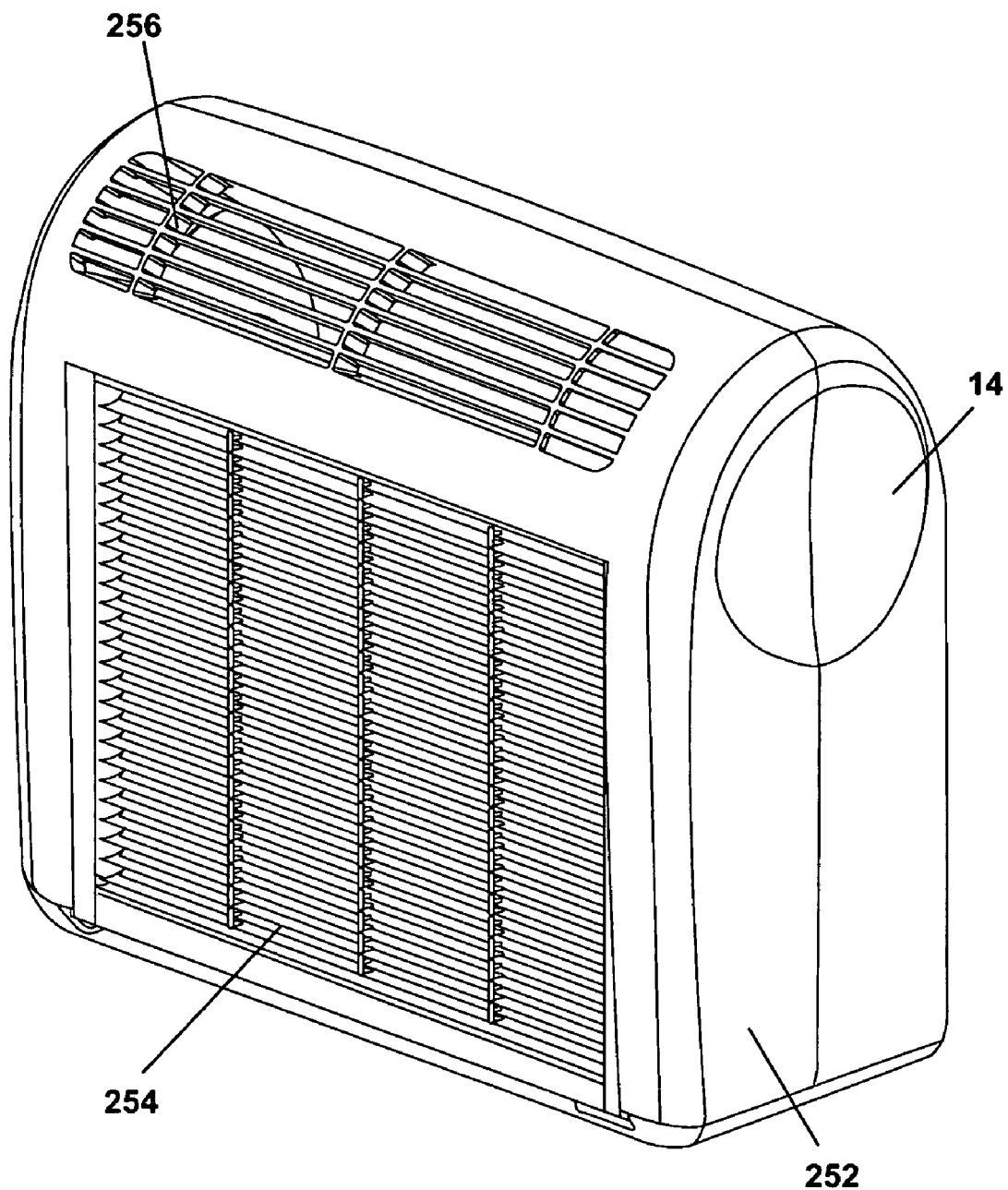
FIG. 20 is a perspective view of the air cleaner illustrated in FIG. 19 with the external housing in place.

FIGS. 19 and 20 illustrate the modular portable air treatment device 10 comprising an air cleaner. An electrostatic precipitator module 250 is utilized in place of the condenser and evaporator, and the compressor 118 and condensate collection bucket assembly 18 are removed, retaining only the air flow module 80 previously described. The elimination of the compressor and the condensate collection bucket assembly enable the precipitator module 250 to extend to the bottom of the device 10, thereby providing a greater air flow area. Consequently, a different front housing 252 is utilized, having a larger front grille 254 and a top grille 256 which is essentially identical to the top grille 22. As illustrated in FIG. 19, air is drawn in through the precipitator module 250, around the back of the blower 90 and along the back wall 170 of the scroll 94 as previously described, to exit the top grille 256. Suitable controls are installed to the chassis for controlling the air flow module 80 and the precipitator module 250.

Figure 21:
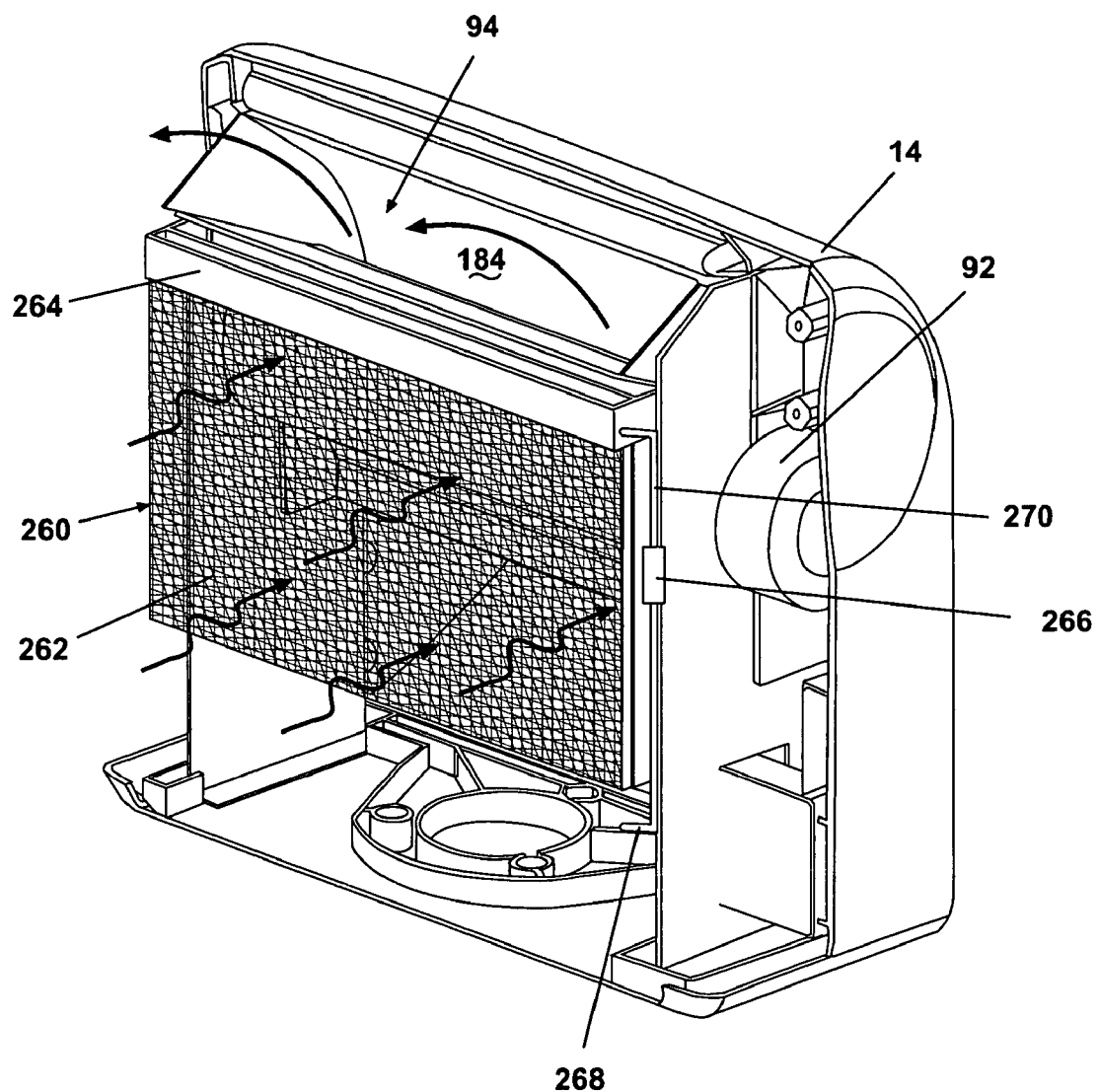
FIG. 21 is a perspective view of a third embodiment of the modular portable air treatment device according to the invention comprising a swamp cooler with selected components removed for clarity.

FIG. 21 illustrates the modular portable air treatment device 10 comprising a swamp cooler. In this embodiment, a swamp cooler module 260 is utilized in place of the condenser and evaporator, and the compressor 118 is removed, retaining only the air flow module 80 previously described. The condensate collection bucket 128 or a reservoir having no cut out for the compressor, can be utilized to contain water for the swamp cooler module 260.

The swamp cooler module 260 comprises a wicking plate 262 which is suspended from the bracket 98 above the reservoir interiorly of the front grille 20. A feed through 264 is attached to and supported by the bracket 98 above the wicking plate 262 for delivering water by gravity feed in a controlled manner to the wicking plate 262, such as by a series of suitably sized drain apertures. A pump 266 is attached to the chassis, and has a suction line 268 for drawing water from the reservoir and a feed line 270 for delivering water to the feed through 264. Suitable controls are installed to the chassis for controlling the air flow module 80.

Figure 22:
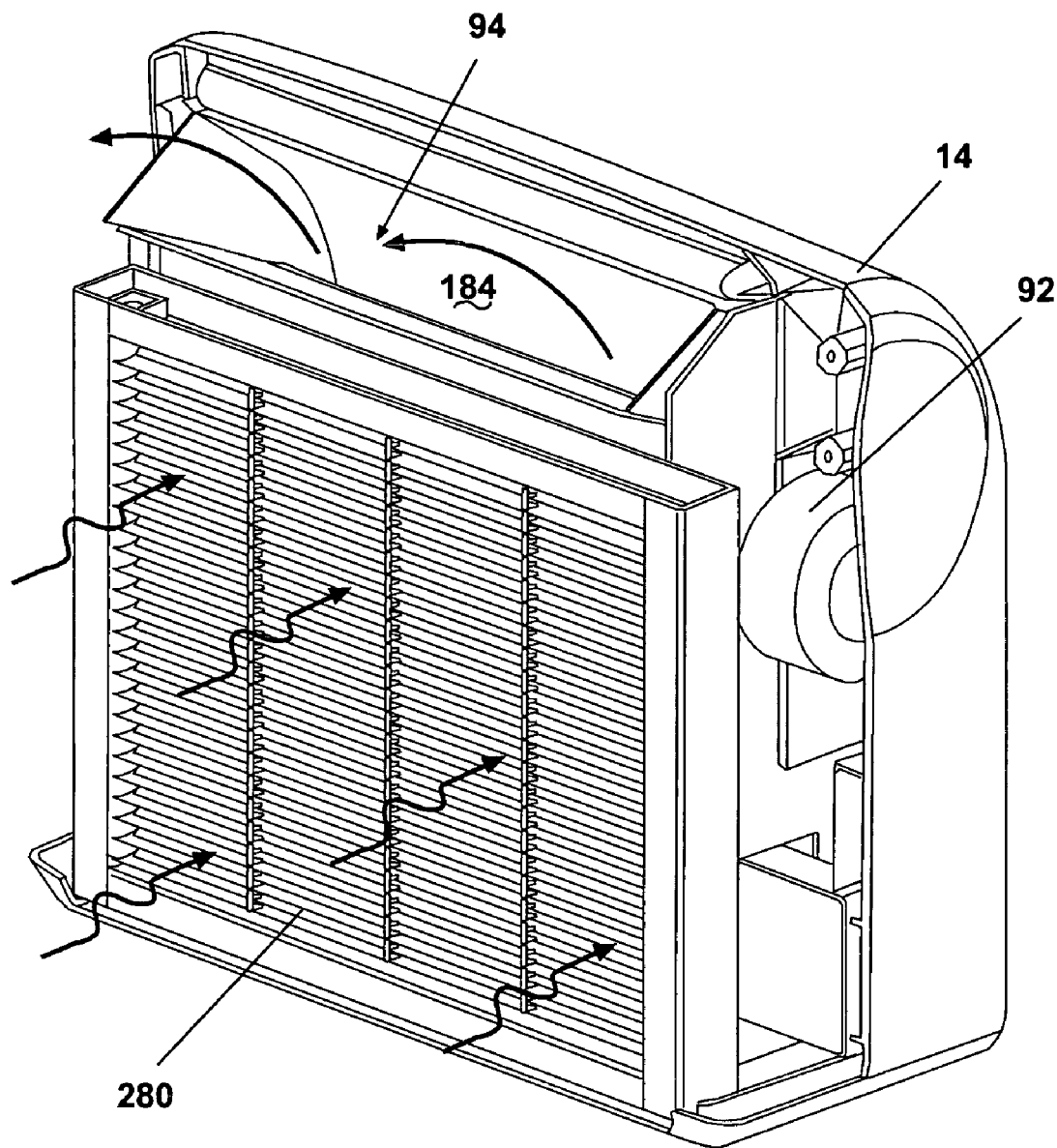
FIG. 22 is a perspective view of a fourth embodiment of the modular portable air treatment device according to the invention comprising a heater with a portion of an external housing removed for clarity.

FIG. 22 illustrates the modular portable air treatment device 10 comprising a heater. In this embodiment, a heater module 280 is utilized in place of the condenser and evaporator, and the compressor 118 and condensate collection bucket 128 are removed, retaining only the air flow module 80 previously described.

The heater module 280 can comprise a suitable heating element, such as a well-known electric radiant heat device, positioned interiorly of the front grille 20. Air will be drawn through the front grille 20 and the heating element, where it will be warmed, into the lower air flow chamber 186 and the upper air flow chamber 184, and out the top grille 22. A well-known thermostatic control unit (not shown) can be utilized to control the temperature of the heated air.

The modular portable air treatment device described herein provides the benefits of both a portable air treatment device having a relatively small footprint and a modular air treatment device with readily interchangeable modules configured around one or more common modules to provide flexible functionality to the air treatment device. The use of a cross-flow blower, and positioning of a compressor in the air stream, improves the energy performance and sound qualities of the device.

By moving the compressor upwardly into the air stream, the height of the device can be reduced. Height reduction is also accomplished by wrapping the condensate collection bucket around the compressor. This also contributes to a reduction in the footprint.

The use of a crossflow blower turning about a horizontal axis enables a reduction of vertical height as compared with a conventional axial flow blower. Because the crossflow blower enables the air flow to proceed through the front of the device 10 and out the top, the device can be mounted on a wall, or placed in contact with a wall, in order to minimize floorspace utilized by the device 10.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A modular air treatment assembly, comprising:
a base module having a mounting portion for receiving one of a plurality of disparate air treatment modules and comprising:
   a chassis having a bottom wall, opposing side walls, and a back wall defining an interior space; and
   an airflow module mounted in the interior space for moving air through the chassis; and
      at least one of a plurality of disparate air treatment modules, the plurality of disparate air treatment modules being interchangeably coupleable to the mounting portion of the base module to provide disparate air treatment functions;
      wherein the plurality of disparate air treatment modules and the base module are adapted to facilitate interchangeability of the disparate air treatment modules, and at least one of a plurality of disparate air treatment modules can provide at least one of a plurality of disparate air treatment functions by selectively coupling a selected one of the plurality of disparate air treatment modules to the mounting portion of the base module.

2. The modular air treatment assembly according to claim 1, wherein the at least one of a plurality of disparate air treatment modules comprises at least one of a dehumidifier module, a swamp cooler module, a heater module, and an air cleaner module.

3. The modular air treatment assembly according to claim 2, wherein the airflow module comprises a crossflow blower.

4. The modular air treatment assembly according to claim 3, wherein the airflow module comprises a scroll for at least partially defining an air flow path.

5. The modular air treatment assembly according to claim 2, wherein the at least one of a plurality of disparate air treatment modules for the dehumidifier comprises a heat exchanger and a compressor fluidly connected to the heat exchanger.

6. The modular air treatment assembly according to claim 5, wherein the at least one of a plurality of disparate air treatment modules for the dehumidifier further comprises a condensate reservoir.

7. The modular air treatment assembly according to claim 6, wherein the condensate reservoir comprises a bucket mounted to the chassis.

8. The modular air treatment assembly according to claim 5, wherein the condensate reservoir comprises a container mounted to an exterior portion of the modular air treatment assembly.

9. The modular air treatment assembly according to claim 2, wherein the at least one of a plurality of disparate air treatment modules for the air cleaner comprises at least one of a filter and an electrostatic precipitator.

10. The modular air treatment assembly according to claim 9, wherein the at least one of the filter and the electrostatic precipitator is one of upstream and downstream of the air flow module.

11. The modular air treatment assembly according to claim 10, and further comprising an inlet for drawing air into the modular air treatment assembly and an outlet for exhausting air from the modular air treatment assembly, the inlet and the outlet at least partially defining the air flow path, and the air flow module and the at least one of the filter and the electrostatic precipitator lie within the air flow path.

12. The modular air treatment assembly according to claim 1, wherein the at least one of a plurality of disparate air treatment modules comprises a dehumidifier module and an air cleaner module.

13. The modular air treatment assembly according to claim 1, wherein the at least one of a plurality of disparate air treatment modules comprises a heater module and an air cleaner module.

14. The modular air treatment assembly according to claim 1, wherein the at least one of a plurality of disparate air treatment modules comprises a swamp cooler module and an air cleaner module.

15. The modular air treatment assembly according to claim 1, wherein the base module comprises one of a condensate bucket, an endless loop filter, and a water supply reservoir.

16. A modular air treatment assembly comprising:
a base module having a mounting portion for receiving one of a plurality of disparate air treatment modules and comprising:
   a chassis having a bottom wall, opposing side walls, and a back wall defining an interior space; and
   an airflow module mounted in the interior space, the airflow module including a crossflow blower and a scroll at least partially defining an air flow path;
at least one of a plurality of front and rear air treatment modules interchangeably coupled with the mounting portion of the base module to provide at least one of a plurality of disparate air treatments, wherein the front air treatment module comprises one of a housing module, an air cleaner module, and a swamp cooler module, and the rear air treatment module comprises one of a housing module, a dehumidifier module, and an air cleaner module;
a control module coupled with the base module; and
   the base module comprising one of a condensate bucket, an endless loop filter, and a water supply reservoir.

17. A method of assembling a modular air treatment device for providing a selected one of a plurality of air treatment functions, the method comprising:
providing a chassis having a bottom wall, opposing side walls, and a back wall defining an interior space;
mounting an airflow module in the interior space to form, in combination with the chassis, a base module having a mounting portion for receiving one of a plurality of disparate air treatment modules;
selecting one of a plurality of disparate air treatment modules providing a plurality of disparate air treatment functions;
interchangeably coupling the one of a plurality of disparate air treatment modules to the mounting portion of the base module to form a modular air treatment device having the selected one of a plurality of air treatment functions.

18. The method according to claim 17, wherein the plurality of disparate air treatment modules includes a dehumidifier module, a swamp cooler module, a heater module, and an air cleaner module.

19. The method according to claim 17, wherein base module comprises one of a condensate bucket, an endless loop filter, and a water supply reservoir.

20. A modular air treatment system, comprising:

a base module having a mounting portion for receiving one of a plurality of disparate air treatment modules and comprising:

a chassis having a bottom wall, opposing side walls, and a back wall defining an interior space; and an airflow module mounted in the interior space for moving air through the chassis; and a plurality of disparate air treatment modules being interchangeably coupleable to the mounting portion of the base module to provide disparate air treatment functions;

wherein one of the plurality of air treatment modules may be selected from the plurality of disparate air treatment modules and assembled to the mounting portion of the base module to form a functionally disparate air treatment device.

* * * * *